US005079565A

United States Patent [19]

Shimizu et al.

[11] Patent Number: 5,079,565

[45] Date of Patent: Jan. 7, 1992

[54] THERMAL TRANSFER PRINTING APPARATUS AND INK PAPER CASSETTE

[75] Inventors: Hiroshi Shimizu; Naohiro Ozawa, both of Yokohama; Toshihiko Gotoh, Tokyo; Kentaro Hamma, Katsuta; Seiji Okunomiya, Katsuta; Youichi Narui, Katsuta, all of Japan

[73] Assignee: Hitachi, Ltd., Tokyo, Japan

[21] Appl. No.: 413,549

[22] Filed: Sep. 27, 1989

[30] Foreign Application Priority Data

Oct. 3, 1988 [JP] Japan ............................... 63-247347

[51] Int. Cl.[5] ........................ G01D 15/10; G06K 7/12; B65H 16/00; B41J 35/28

[52] U.S. Cl. ................................ 346/76 PH; 235/469; 235/494; 242/57; 400/208; 400/249; 354/217

[58] Field of Search .................... 346/76 PH; 400/208, 400/240.3, 240.4, 249; 235/469, 494; 242/57; 354/217

[56] References Cited

U.S. PATENT DOCUMENTS

| | | | |
|---|---|---|---|
| 4,586,834 | 5/1986 | Hachisuga et al. | 346/76 PH |
| 4,588,316 | 5/1986 | Everett, Jr. | 400/240.4 |
| 4,710,781 | 12/1987 | Stephenson et al. | 346/76 PH |
| 4,910,533 | 3/1990 | Sasaki et al. | 346/151 |
| 4,970,531 | 11/1990 | Shimizo et al. | 346/76 PH |

FOREIGN PATENT DOCUMENTS

| | | | |
|---|---|---|---|
| 3535767 | 4/1986 | Fed. Rep. of Germany . | |
| 56-67278 | 6/1981 | Japan | 400/120 |
| 60-19563 | 1/1985 | Japan . | |

*Primary Examiner*—Benjamin R. Fuller
*Assistant Examiner*—Gerald E. Preston
*Attorney, Agent, or Firm*—Fay, Sharpe, Beall, Fagan, Minnich & McKee

[57] ABSTRACT

A thermal transfer printing apparatus includes a reading device for reading a code registered section provided on an ink sheet cassette, and a color discrimination device, a part of which is provided on a thermal head. The apparatus acts to heat an ink sheet superposed on a print paper by means of the thermal head to print an image on the print paper. The ink sheet cassette includes a pair of ink shafts on which both ends of a continuous ink sheet having a continuous film or paper with inks applied thereon are wound, and a cassette case in which the ink shafts are received, at least one of the ink shafts being adapted to be drivingly connected in the axial direction to a torque supply shaft inserted from the outside of the cassette case so that driving torque is supplied from the torque supply shaft to the ink shaft. The code registered section is composed of a first pattern portion of alternating white and black patterns and a second pattern portion in which information connecting the ink sheet is coded and recorded in line with the first pattern portion. The code registered section is provided on one of the ink shafts in the cassette case.

30 Claims, 14 Drawing Sheets

FIG. 16
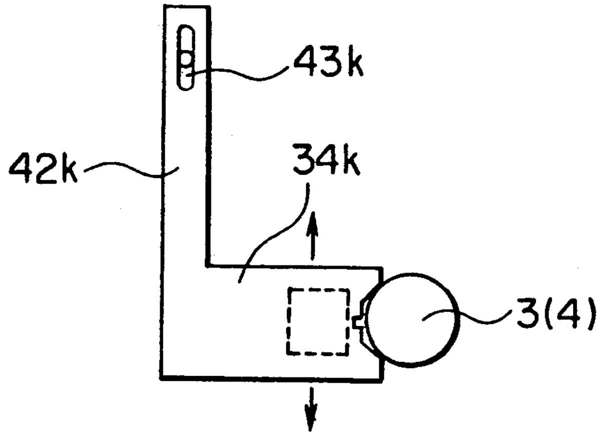
FIG. 17A
FIG. 17B
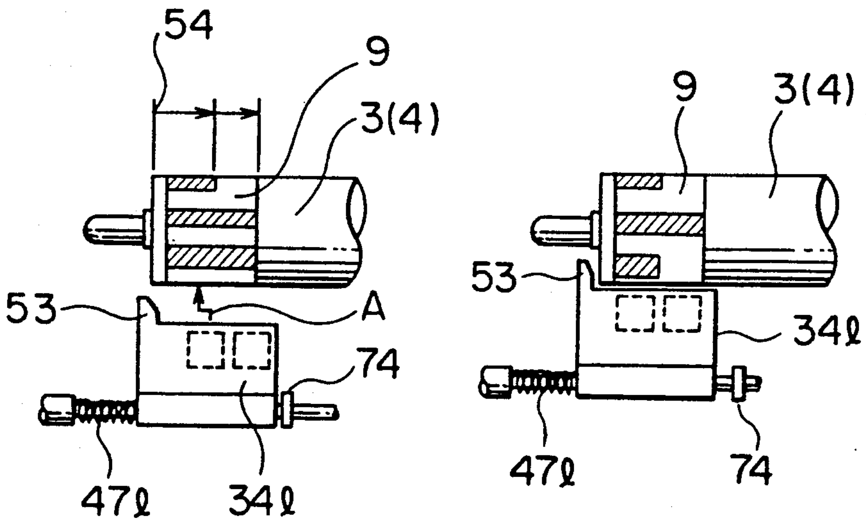
FIG. 18
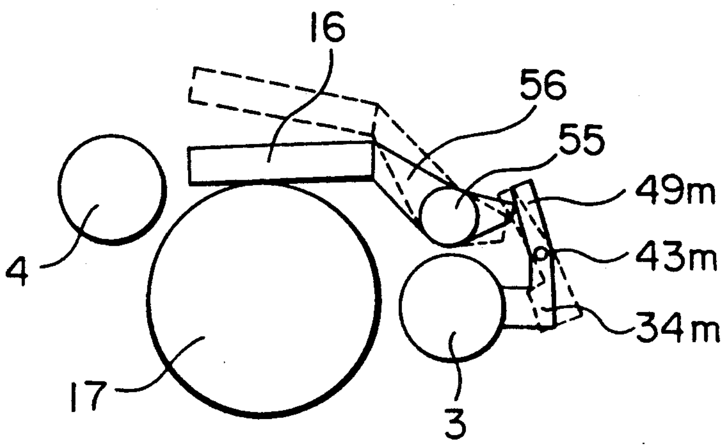

THERMAL TRANSFER PRINTING APPARATUS AND INK PAPER CASSETTE

BACKGROUND OF THE INVENTION

The present invention relates to a thermal transfer printing apparatus capable of performing multi-color printing by superposing plurality of colors. The present invention also is concerned with an ink paper cassette for use in this printing apparatus.

Terminal output units have been known which are capable of printing letters and patterns in accordance with various kinds of information output from devices such as a communication apparatus or computers. In recent years, there is an increasing demand for color printing in addition to monochromatic (black and white) printing. Among various printing techniques available for multicolor printing, a thermal transfer printing method is considered as being most promoting because of simple construction and maintenance-free operation, and this type of multi-color printing apparatus has been put to practical use.

Hitherto, a thermal transfer type printing system employs a thermal head which comprises a plurality of arrays of fine heating elements which are externally controllable. In operation, the thermal head is pressed onto an ink sheet composed of a sheet-like base and a heat fusible solid ink applied to the surface of the base so as to print information on a desired print paper.

Multi-color printing with an ink sheet of the type mentioned above is conducted by repeating printing operation a plurality of times with inks of different hues such that images of different hues or colors are superposed on one another. To this end, the ink sheet has regions of a predetermined length in which inks of different colors have been applied such that the regions of different colors appear sequentially and repeatedly along the length of an ink sheet. After completion of printing in one of the colors, printing is conducted with the ink of the next color which is provided in a subsequent region of the ink sheet, and this operation is repeated so that images of successive colors are superposed thereby attaining the multi-color printing.

Thus, the use of an ink sheet of the kind described in a thermal transfer printing apparatus essentially requires means for supplying the ink sheet and means for collecting used portion of the ink sheet.

Coloring materials ordinarily used in thermal transfer printers, such meltable pigments, as well as heat subliming dyes, can be used as the coloring agent to be applied to the ink sheet. The sensitivity of the sheet in terms of the relationship between the amount of heat applied by the thermal head and the thickness of the color of the print varies depending on factors such as the kind of the ink, thickness of application of the ink, thickness of the sheet base member, and so forth. Thus, different ink sheets exhibit different sensitivity characteristics. In addition, a sublimiting dye does not exhibits linear sensitivity characteristics: namely, the density of the color developed does not change linearly in relation to the heat applied by the thermal head. When this type of ink sheet is used, therefore, it is necessary to control the heat input in a non-linear manner in relation to the color density, in order to obtain a desired color density. This requires that information concerning the non-linear sensitivity characteristics, e.g., 60-byte information with 20-bytes for each of three colors, be input by a suitable input means. Storage of the ink characteristics in the printing apparatus cannot cope with a change in the characteristics of ink sheet such as improvement due to, for example, development of a novel dye. In order to obtain a desired printing performance, it is also necessary that various types of information concerning the ink sheet such as the number of colors carried by the ink sheet, length of each color region and so forth are input to the thermal transfer printing apparatus.

Hitherto, a module type ink sheet cassette of the type disclosed in Japanese Patent Unexamined Publication No. 56-67278 has been proposed for various reasons such as easiness of handling. This type of ink sheet cassette has an ink sheet supply shaft and an ink sheet takeup shaft accommodated in a cassette case and can easily be mounted on and demounted from the thermal transfer printing apparatus. Thus, the known ink sheet cassette has a supply shaft on which new or unused thermal transfer ink sheet is wound and a takeup shaft for taking up used ink sheet. These shafts are arranged rotatably at a predetermined spacing from each other with the ink sheet stretched therebetween. This ink sheet cassette is mounted as desired on the printing apparatus so as to perform printing. This type of ink sheet cassette is disclosed, for embodiment, in the specification of U.S. Pat. No. 4,901,090.

This cassette merely supports these two shafts rotatably and has no means for giving ink sheet information to the thermal transfer printing apparatus. Thus, the known thermal transfer printing apparatus and ink sheet have suffered from the following problems or shortcomings.

(1) It is impossible to automatically transmit information concerning the numbers of colors carried by the ink sheet such as monochromatic, bi-color, tri-color, tetra-color etc. and so forth. It is also impossible to automatically change the printing sequence in accordance with the printing sequence. Namely, a laborious manual switching operation has been necessary.

(2) It is impossible to automatically transmit information such as sensitivity of inks, kinds of inks (whether sublimiting dye or heat meltable pigment) and so forth to the thermal transfer printing apparatus. Thus, the thermal transfer printing apparatus could not cope with a change in the characteristics such as sensitivity of the ink caused by an improvement in the ink. This problem, as well as the above-mentioned problem of necessity of troublesome manual work, has not been fully recognized.

Furthermore, it is to be pointed out that no proposal has been made heretofore as to a measure for discriminating colors when an ink sheet of bi-color, tri-color or tetra-color-type ink sheet is used. Furthermore, no consideration has been made to provision of means for facilitating mounting of shafts in the cassette.

To sum up, it is necessary that an ink sheet cassette to be used on a thermal transfer printing apparatus has means for delivering ink sheet information to the thermal transfer printing apparatus.

Such ink sheet information delivering means has to meet the following requirements.

(1) The ink sheet cassette must enable the printing apparatus to print information even when the information to be recorded is comparatively complicated.

(2) The information should be recorded at a portion which is easy to read when the cassette is mounted on the apparatus.

(3) The ink sheet cassette must enable an easy alteration of the content of information, without requiring substantial modification of dies for forming the cassette.

(4) The cassette should be designated to avoid breakdown of the information due to mis-handling of the cassette.

When a specifically high degree of precision of scanning speed is required for reading of the ink sheet information recorded in the ink sheet cassette, it is necessary that a highly precise mechanism be employed specifically for the purpose of reading, with the result that the production cost is raised undesirably.

Various methods have been proposed and used for formulating ink sheet information into a bar code and to provide the bar code on the cassette. One of such methods is disclosed in the specification of U.S. Pat. No. 4,970,531.

It is possible to print a bar code on a label or the like and to manually adhere the label on an outer surface of the cassette case. In such a case, there is a risk that the record of the ink sheet information may be impaired due to touch of fingers. In another known method, the scanning for reading the recorded ink sheet information is conducted during insertion of the cassette into the printing apparatus. This method, however, essentially requires that the power supply has been turned on when the cassette is inserted. In addition, misreading tends to occur because the reading speed varies depending on the speed of inserting movement. The problems would be overcome if the scanning is conducted after completion of insertion. This however essentially requires a mechanism including a movable member. In addition, it is difficult to design and fabricate cassettes of a variety of colors. In a different method, a code registered section is provided on the leading end of the ink sheet. This arrangement eliminates any necessity for movable part for the scanning of the code because the tape itself runs during the printing. Unfortunately, however, the mark is readable only at the time of initial use of the ink sheet. It has also been attempted to put a mark representing the ink sheet information on a deckle edge of the sheet by adhesion or printing. This method, however, requires an impractically high degree of precision of the cutting, thus causing the production cost to rise.

SUMMARY OF THE INVENTION

Accordingly, an object of the present invention is to provide a thermal transfer printing apparatus which has a simplified construction but yet capable of performing printing of fine patterns.

Another object of the present invention is to provide a color discrimination means which is capable of discriminating colors on an ink sheet and capable of bringing an appropriate color into the printing operation.

Still another object of the present invention is to provide shaft mounting means which enables easy mounting of ink sheet shafts in a cassette.

To these ends, according to one aspect of the present invention, there is provided a system in which information concerning an ink sheet is recorded in an ink sheet cassette and read by a thermal transfer printing apparatus, wherein various types of ink information such as the number of colors carried by the ink sheet, sensitivity and so forth are provided on the peripheral surface of an ink sheet shaft in the form of a bar code, while a reading means is provided on the thermal transfer printing apparatus so as to read the bar code mark by making use of operation of the mechanism during operation of the apparatus, e.g., rotation of the ink sheet shaft.

According to the present invention, the code registered section is provided on the peripheral surface of the ink sheet shaft such that a reading means may scan and read the code by making use of rotation of the shaft during the printing. According to this arrangement, the ink sheet and the ink sheet shaft are integral with each other. Usually, an ink sheet is fabricated at a width and length which are greater than those of the ink sheet to be loaded in a cassette. The sheet is then slitted in the breadthwise direction, i.e., along the longitudinal axis, and is then cut when a predetermined length corresponding to a predetermined number of prints has been wound on the ink sheet shaft. Since the indication of a specific ink sheet is written on the ink sheet shaft on which this ink sheet is wound, the risk for any wrong correspondence between the bar code and the ink sheet is minimized. Preferably, the code registered section is provided on the outer peripheral surface of the supply shaft rather than the takeup shaft because such an arrangement enables a reading device to be installed in a space around the supply shaft which is ample as compared with the space around the takeup shaft which has to accommodate a complicated takeup mechanism, thus allowing an economical use of installation space. Preferably, the bar code providing the ink sheet information written on the mark is composed of two rows set aside: namely, a row of alternating black and white line patterns of a regular or irregular interval, and an information signal pattern which is in line with the above-mentioned line pattern. The reading means may have a combination of an LED and a sensor which are operative with infrared or visible rays. The LED or the sensor has a slit opening of a size which is smaller than that of the above-mentioned pattern so that the bar code is read as the opening is brought close to the bar code.

The discrimination of colors on the ink sheet may employ a sensor mounted on the thermal head and capable of reading the color on the ink sheet and a light source such as an LED opposing the sensor across the ink sheet and capable of illuminating the sensor.

The mounting of the shaft in the cassette can easily be achieved by inserting the end of the shaft into a hole formed in the cassette.

The coded mark may be adhered to a suitable portion of the peripheral surface of the ink sheet shaft which is less liable to be touched by the user's hand, so that it can always correctly indicate the information concerning the ink sheet without any risk of contamination or corrosion. It is possible to use a couple of reading means for reading two rows of pattern simultaneously or, alternatively, these two rows of pattern may be read simultaneously by a single reading means. In both cases, each time one cycle of the black and white alternating line patterns is read, the ink sheet information pattern recorded in line with the line pattern is read and the reading outputs are sampled and converted into digital signals. These operations are possible even when the speed of the reading scan is irregular, i.e., even when the speed of operation of mechanical portion which operates for the reading scan is not controlled at all or controlled only slightly. It is therefore unnecessary to provide specific specifications for obtaining a constant operation speed or a constant speed hysteresis for the purpose of the reading scan.

Preferably, the opening of the LED or the sensor has a size smaller than the pattern. By keeping the LED and the sensor into close contact with the pattern during the reading, it is possible to prevent any cross-talk between adjacent patterns, thus eliminating any risk of erroneous operation.

The device for discriminating the color of the ink sheet, which has a sensor disposed on the thermal head and an LED opposing the sensor across the ink sheet, can be installed in a comparatively limited space in the mechanism. The light transmitted from the LED impinges upon the sensor through the ink sheet. The sensor analyzes the light attenuated through the ink sheet so as to discriminate the color of the ink sheet. It is thus possible to read the color of the ink sheet and to correctly locate the ink sheet in accordance with the result of discrimination of the ink sheet, whereby the printing is conducted accurately without error.

The mounting of the shafts on the cassette can be conducted simply by inserting ends of the shafts into holes provided in the cassette, so that the cassette can be mass-produced at a reasonable cost.

BRIEF DESCRIPTION OF THE DRAWINGS

FIGS. 16, 17A and 17B are illustrations of an embodiment in which high precision of positional relationship is obtained between the sensor holder and the shaft;

FIG. 18 is an illustration of an embodiment in which the sensor holder is made to contact with the shaft by making use of the operation for pressing a thermal head against a platen;

DESCRIPTION OF THE PREFERRED EMBODIMENTS

Preferred embodiments of a thermal transfer printing apparatus of the present invention will be described hereinunder with reference to the accompanying drawings.

Figure 1:
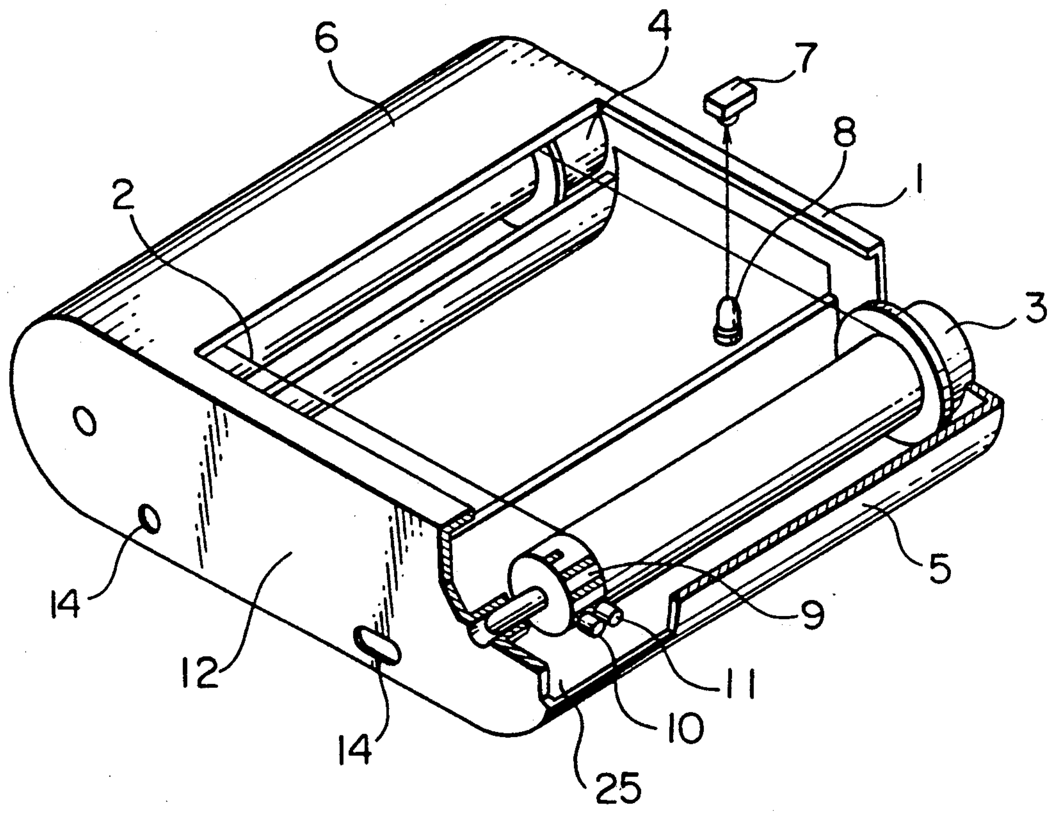
FIG. 1 is a perspective view showing the relationship between an ink sheet cassette of the present invention and a thermal transfer printing apparatus of the present invention.

FIG. 1 is a perspective view of an ink sheet cassette for use on a thermal transfer printing apparatus of the present invention, showing also the construction of a sensor. An ink sheet cassette 1 incorporates a supply shaft 3 on which new or unused portion of an ink sheet 2 is wound and a takeup shaft 4 for taking up used portion of the ink sheet 2. These shafts 3 and 4 are respectively disposed in a supply shaft receiving portion 5 and a takeup shaft receiving portion 6, both of which are defined in the cassette. These portions 5 and 6 are connected to each other through a connecting portion 12. The ink sheet 2 is stretched between the supply shaft 3 and the takeup shaft 4. The ink sheet 2 is progressively supplied from the supply shaft 3 and taken up by the takeup shaft 4. The connecting portion 12 of the cassette 1 is provided with a locating hole 14 for correctly locating the cassette when the latter is mounted on the apparatus.

A code registered section 9 in which a coded information concerning the ink sheet is provided on a portion of the supply shaft 3 near one end thereof. The code registered section 9 is formed by directly printing the code or adhering a medium with the code printed thereon to the above-mentioned portion of the supply shaft 3. The arrangement is such that the code is read in accordance with rotation of the shaft by a clock sensor 10 and a bar-code sensor 11 which are adapted to be pressed onto the code registered section 9. An ink sheet sensor 7 and an ink sheet sensor LED 8 are disposed to vertically oppose each other across the ink sheet stretched between the two shafts so that the color of the ink sheet is read from the light transmitted through the ink sheet.

Figure 2:
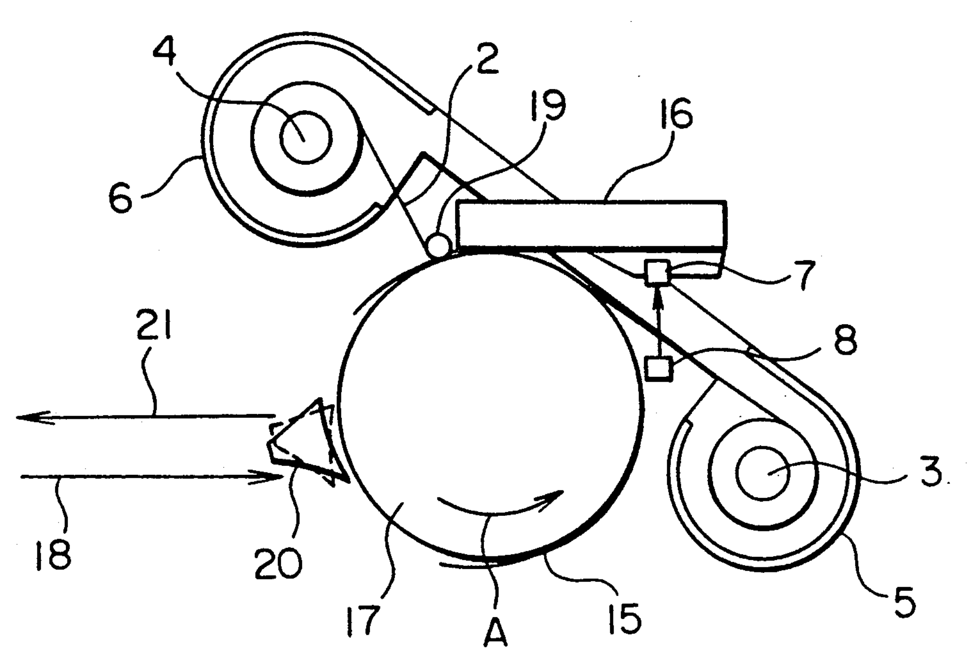
FIG. 2 is an illustration of operation of the thermal transfer printing apparatus.

FIG. 2 is an illustration of the mechanical portion of the thermal transfer printing apparatus as viewed from a lateral side thereof. The mechanical portion is composed mainly of a platen drum 17 and a thermal head 16. A photosensitive paper 15 is introduced into the thermal transfer printing apparatus along a paper feed passage 18 and is wound around the platen drum 17. The platen drum 17 with the paper 15 wound thereon is rotated in the direction of an arrow A so as to bring the leading end of the photosensitive paper 15 to a position beneath the thermal head drum 16. The ink sheet 2 stretched between the supply shaft 3 and the takeup shaft 4 in the ink sheet cassette is positioned between the thermal head 16 and the platen drum 17. The thermal head 16 is capable of pressing the ink sheet 2 and the photosensitive paper 15 superposed one on the other to the platen drum 17. A multiplicity of small heating elements are arranged in an array or arrays at a pitch or density of 512 elements per 1 mm. There elements can be energized independently by externally given signals so as to generate heat at independently controllable levels. A sublimiting ink applied to the ink sheet 2 under the thermal head 16 is capable of receiving heat from the thermal head 16, so that the ink is made to sublimate and be transferred to the photosensitive paper 5 at rates corresponding to the amounts of the heat generated by the respective heating elements. The greater the amount of heat, the greater the amount of ink sublimated. In consequence, a greater amount of ink is transferred to the photosensitive paper 15 to produce print of a higher density. Thus, 512 dots are printed with a suitable gradation on the photosensitive paper 15 as the rates of heat generation of the respective heating elements are controlled independently, thus completing printing of one line. Thereafter, the platen drum 17 is rotated in the direction of the arrow A by an amount corresponding to one line and then the same printing operation is executed. This operation is repeated 640 times so that an image composed of 640×512 pixels is formed with gradation on one frame on the photosensitive paper 15. After completion of the printing of the image on one frame, the platen drum 17 is further rotated to bring the leading end of the photosensitive paper 15 to the position beneath the thermal head 16, and the same printing operation is executed to print an image in a second color, followed by printing in a third color. When the printing in the third color is finished, the paper feed/discharge change-over member 20 is moved to a position shown by a solid line so that the photosensitive paper is fed towards a discharge path 21 so as to be discharged from the thermal transfer printing apparatus. During the printing in each color, the ink sheet sensor 7 and the ink sheet sensor LED 8 in cooperation detect the color of the ink, whereby the printing operation is controlled such that the ink of an adequate color is brought to the position beneath the thermal head 16. Thus, printing is executed in yellow as the first color, in magenta as the second color and in cyan as the third color, whereby a full-color image composed of 640×512 pixels is formed with gradation on the photosensitive paper 15.

Figure 3A:
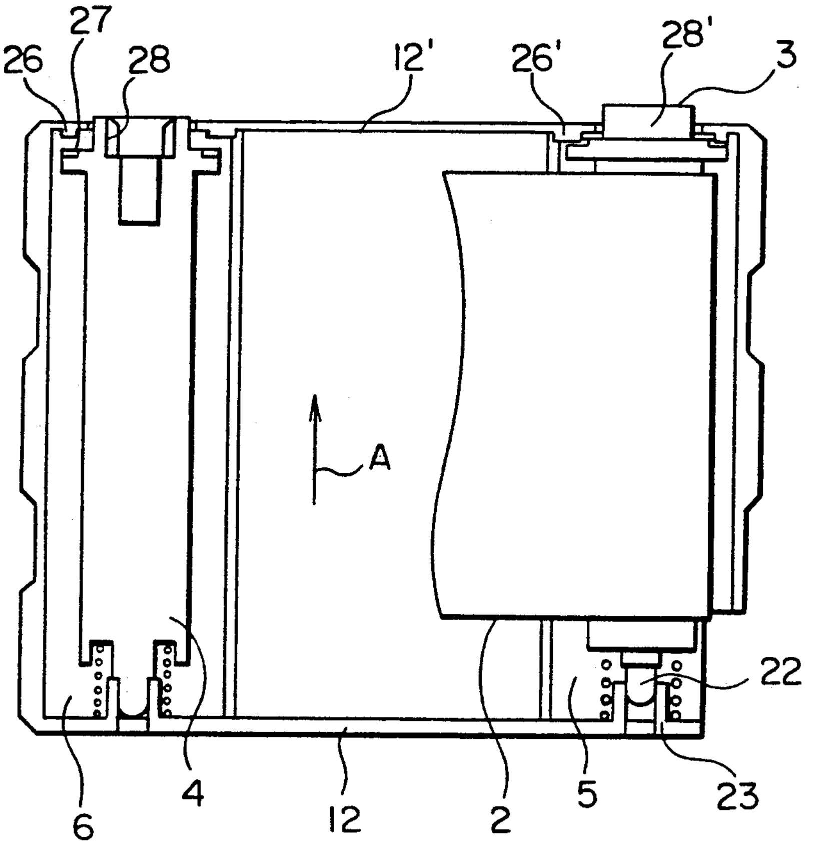
FIGS. 3A to 3C are illustrations of an ink sheet cassette in accordance with the present invention.
Figure 3C:
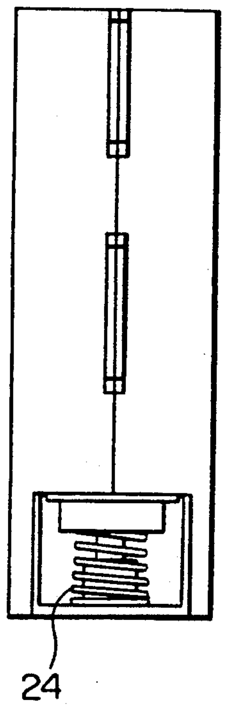
Figure 3B:
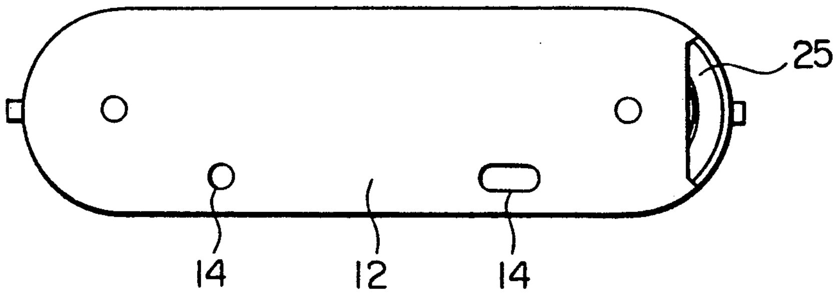

FIGS. 3A to 3C are illustrations of an ink sheet cassette for use in the thermal transfer printing apparatus of the present invention.

The ink sheet cassette has a supply shaft receiving portion 5, a takeup shaft receiving portion 6 and connecting portions 12, 12' through which the portions 5 and 6 are connected to each other. The supply shaft receiving portion 5 receives the supply shaft 3 on which new or unused portion of the ink sheet 2 is wound, while the takeup shaft receiving portion 6 receives the takeup shaft 4 for taking up the used portion of the ink sheet 2. The ends 22 of both shafts are received in bearings 23 provided in the cassette so as to be located by these bearings. Positioning holes 14 are formed in the connecting portion 12 adjacent to the ends 22 of the shafts. When the cassette is mounted on the thermal transfer printing apparatus, positioning pins (not shown) are inserted into these positioning holes so as to provide required precision of the positional relationship between the ends of the shafts and the thermal transfer printing apparatus. As seen from FIGS. 3B and 3C, shaft pressing springs 24 are provided between the connecting portion 12 of the cassette and the ends 22 of the shafts so as to urge the shafts such that torque transmitting portions 28, 28' are projected from the cassette. As seen from FIG. 3A, anti-rotation grooves 27, 27' are formed in the peripheral surfaces of the torque-transmitting portions 28, 28' of the shafts. These grooves 28, 28' cooperate with pawls 26, 26' in the cassette so as to prevent the shafts from rotating. As the cassette is inserted into the thermal transfer printing apparatus in the direction of the arrow A shown in FIG. 3A, torque supply shafts (not shown) of the apparatus are brought into engagement with the torque transmitting portions 28, 28' of the supply shaft 3 and the takeup shaft 4. In consequence, the supply shaft 3 and the takeup shaft 4 are pushed in the direction opposite to the arrow A against the bias of the spring 24, so that the anti-rotation grooves 27 are disengaged from the pawls 26. In this state, both shafts can be driven by the torque supply shafts of the thermal transfer printing apparatus. Thus, the torque supply shaft engages with the torque transmitting portions 28 of the takeup shaft 4 so that the torque supply shaft and the takeup shaft 4 are located with respect to each other. In consequence, a high degree of precision of the positional relationship between the thermal transfer printing apparatus and the both shafts are obtained so as to ensure a high quality of the print. As seen from FIG. 3B, the ink sheet cassette is provided with a sight window so as to enable visual check or mechanical measurement of the roll of the ink sheet 2 wound on the supply shaft 3, thus providing information concerning the amount of the remaining ink sheet.

As will be described later, a code registered section is provided on one end of the shaft 3 or the shaft 4. The arrangement is such that a sensor capable of sensing the code registered section is inserted through the sight window 25 so as to read information concerning the ink sheet written on the code registered section.

Figure 4A:
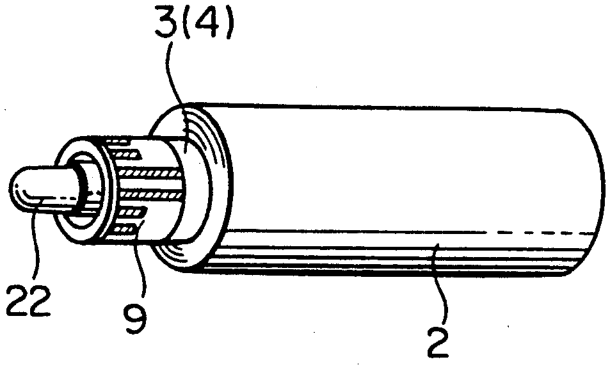
FIGS. 4A and 4B are illustrations of positional relationships between a code registered section provided on an ink sheet shaft and a reading sensor.
Figure 4B:
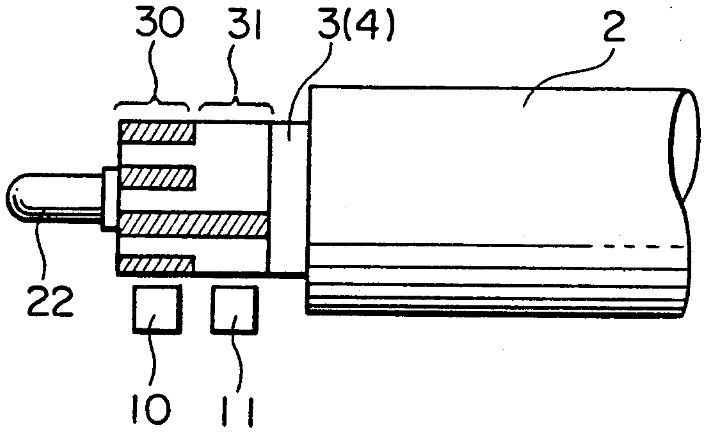

FIGS. 4A and 4B illustrate the position of mounting of the sensor with respect to the position of the code registered section 9 provided on the end of the shaft 3 or 4.

More specifically, FIG. 4A shows the code registered section 9 provided on the end 22 of the shaft 3 or 4. As seen from FIG. 4B, the code registered section 9 is composed of a clock 30 and a bar code 31. The clock 30 is formed by dividing the outer peripheral surface of the shaft 3 or 4 into a plurality of, e.g., 24 regions which are alternatingly colored in black and white so as to form a clock pattern. The bar code 31 records information concerning the ink sheet in binary code in line with the clock 30. On the other hand, the thermal transfer printing apparatus has a clock sensor 10 and a bar code sensor 11, both of which are pressed onto the clock 30 and the bar code 31 so as to read the clock 30 and the bar code 31 as the shaft 3 or 4 rotates. A code processing device (not shown) provided in the thermal transfer printing apparatus is triggered by the output of the clock sensor 10 so as to sample the output signal of the bar code sensor 11 thereby enabling correct reading of the information even when the speed of rotation of the shaft 3 or 4 is changed.

Figure 5:
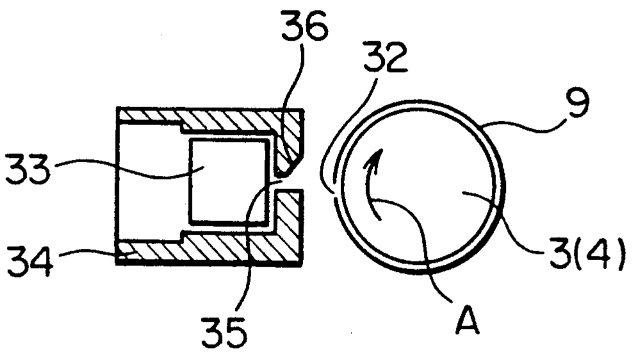
FIGS. 5 to 11B are illustrations of examples of a sensor block incorporated in the reading sensor.

FIG. 5 illustrates an embodiment of the sensor holder 34 which enables a sensor having a comparatively large opening to read the clock and the bar code which have small widths. In case the code registered section 9 is formed by adhering a label-type member carrying the code onto the outer peripheral surface of the shaft 3 or 4, the sensor holder 34 effectively prevents the label from coming off the shaft 3 or 4.

A sensor 33 having a comparatively large opening is mounted in the sensor holder 34. The width of the opening of the sensor 33 is restricted by a slit 35. The slit 35 has a width which is equal to or smaller than that of the clock and the bar code written on the code registered section 9, so that any cross-talk between the adjacent black and white patterns during reading of the clock and the bar code is prevented. As seen from FIG. 5, the upper edge of the slit 35 is cut-away as at 36 so as to prevent the seam 32 of the code registered section 9 on the shaft 3 or 4 from being caught by the edge of the slit when the shaft rotates in the direction of the arrow A. In some cases, the shaft 3 or 4 rotate in a direction opposite to the arrow A depending on the operation sequence of the thermal transfer printing apparatus. In such thermal transfer printing apparatus, both the upper and lower edges of the slit 35 are cut-away as at 36.

Figure 6A:
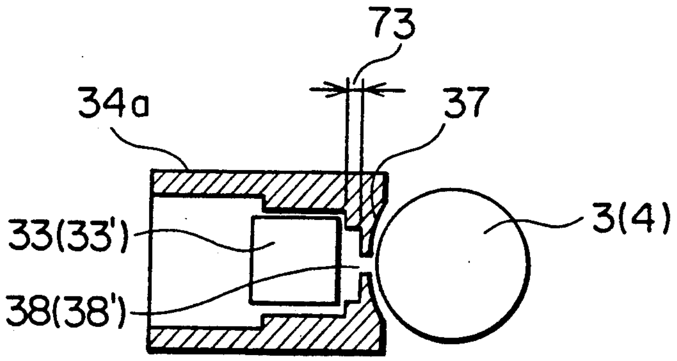
Figure 6B:
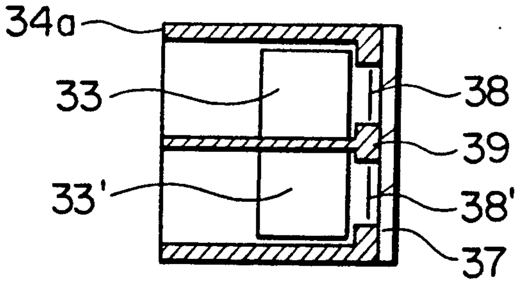

FIGS. 6A and 6B show an embodiment of the sensor holder which is configured in consideration of the positioning of the sensor holder 34*a* and the shaft 3 or 4 with respect to each other.

More specifically, FIG. 6A is a sectional view illustrating the state of contact between the shaft 3 or 4 and the sensor holder 34*a*. The sensor holder 34*a* has a curved surface 37 opposing the shaft 3 or 4. This curved surface 18 automatically adjusts the positions of the sensor holder 34*a* and the shaft 3 or 4 such that the center of the sensor holder 34*a* is aligned with the center of the shaft when the sensor holder 34*a* is pressed against the shaft 3 or 4. FIG. 6B is a sectional view of the sensor holder 34*a* as viewed from upper side thereof. It will be seen that a pair of sensors 33 and 33′ are mounted inside the sensor holder 34*a*. Functions for reading different portions of the code registered portion are allocated to both sensors 18, 18, so that these sensors serve as a clock sensor and a bar code sensor, respectively. The openings 38, 38′ in the sensor holder 34*a* are elongated in parallel with the clock and the bar code when viewed from the upper side. Thus, the openings 38, 38′ are wide when viewed from the upper side. These openings 38, 38′, however, have a small width when viewed from a lateral side as shown in FIG. 6A. The openings 38, 38′ therefore may be referred to as slits. In order to prevent any cross-talk between two sensors 33 and 33′, a partition plate 39 is provided between two sensors 33 and 33′. A gap 73 is left between the sensors 33, 33′ and the openings 38, 38′ so that the sensors 33, 33′ having openings of a comparatively large area do not contact with the portions of the sensor holder defining the openings 38, 38′. This arrangement enables the whole light coming through the openings 38, 38′ to be received by the openings of the sensors 33, 33′, so that a high light-receiving sensitivity is obtained.

Figure 7:
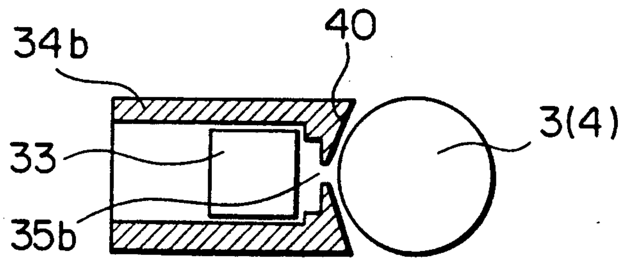

FIG. 7 is a sectional view of another embodiment of the sensor holder 34*b* improved to enable the sensor holder 34*b* and the shaft 3 or 4 to be positioned with respect to each other. The sensor holder 34*b* is provided with slant surfaces 40 opposing the shaft 3 or 4. The levels of the sensor holder 34*b* and the shaft 3 or 4 are automatically adjusted such that the center of the sensor holder 34*b* is aligned with the center of the shaft 3 or 4 and, at the same time, the spacing between the shaft 3 or 4 and the sensor 33 is adjusted to maximize the detection sensitivity, when the sensor holder 34*b* is moved to approach the shaft 3 or 4.

Figure 8:
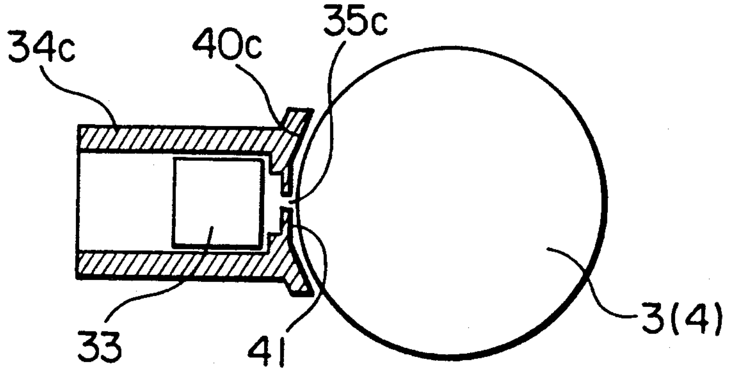

FIG. 8 is a sectional view of another embodiment of the sensor holder. As in the case of the sensor holder shown in FIG. 7, this embodiment of the sensor holder denoted by 34*c* is provided with slant surfaces 40*c* opposing the shaft 3 or 4. The effect produced by the slant surface is the same as that described in connection with FIG. 7 and, therefore is omitted. The sensor holder 34*c* features a biasing plate 41 provided on the portion of the sensor holder 34*c* contactable with the shaft 3 or 4. When the slit 35*c* contacts the shaft 3 or 4, the biasing plate 41 prevents any cross-talk attributable to leak of light through a gap formed between the slit 35*c* and the shaft 3 or 4 due to the presence of the slant surface 40*c*.

Figure 9:
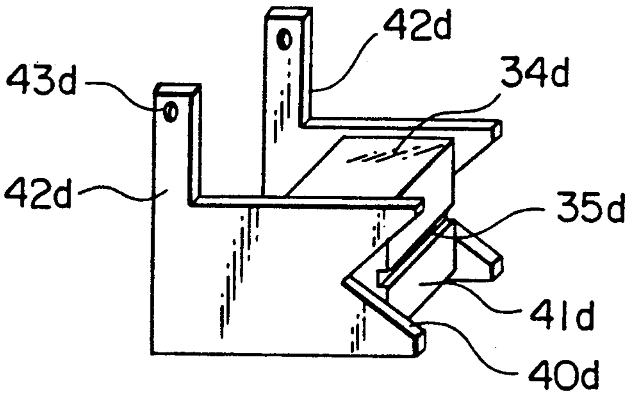

FIG. 9 is a perspective view of a practical embodiment of a sensor holder 34*d* of the type having the slant surfaces and the biasing plate as described in connection with FIG. 8.

The sensor holder 34*d* is disposed between a pair of arms 42*d*, 42*d*. A biasing plate 41*d* provides the surface of the sensor holder 34*d* facing the shaft. The ends of the arms 42*d* facing the shaft are notched in a V-like form so as to provide the slant surfaces 40*d*. The positions of the slant surfaces 40*d* are determined such that the contact between the slant surfaces 40*d* and the shaft 3 or 4 for locating the sensor holder 34*d* with respect to the shaft 3 or 4 is never hampered by the contact between the biasing plate 41*d* and the shaft 3 or 4. In an alternative arrangement which provides the same effect as that described above, the sensor holder 34*d* is movably supported between the arms 42*d*, 42*d* and is biased by a biasing means such as a weak spring (not shown) towards the shaft 3 or 4.

Figure 10:
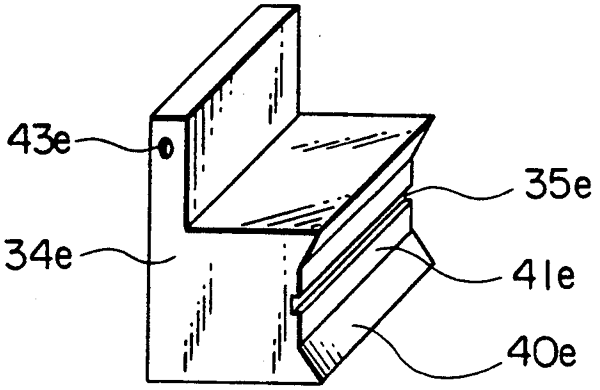

FIG. 10 is a perspective view of another practical embodiment of the sensor holder having the slant surfaces and the biasing plate which are shown in FIG. 8. The sensor holder 34*e* of this embodiment has a cross-section similar to that shown in FIG. 8. Thus, the sensor holder has slant surfaces 40*e* and a biasing plate 41*e*.

Figure 11A:
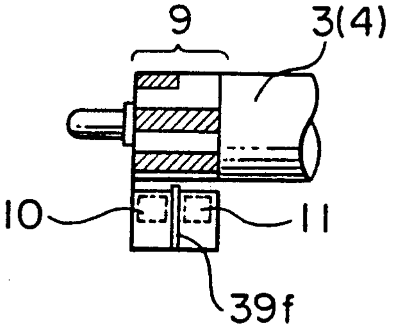
Figure 11B:
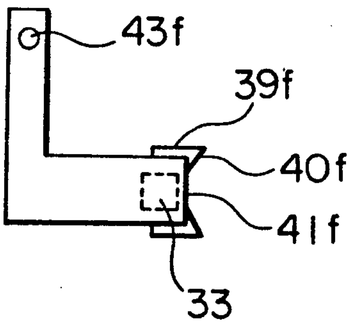

FIGS. 11A and 11B show still another practical embodiment of the sensor holder of the type having the slant surfaces and the biasing plate shown in FIG. 8.

More specifically, FIG. 11B shows the relative positions of the sensor holder 34*f*, two sensors 10, 11 in the holder and the slant surfaces 40*f*. A partition plate 39*f* is provided between the clock sensor 10 and the bar code sensor 11 and has the slant surfaces 40*f* as shown in FIG. 11B. The partition plate 39*f* having the slant surfaces 40*f* and the biasing plate 41*f* in cooperation provide the same effect for locating the sensor holder with respect to the shaft as that described in connection with FIG. 8, as well as the effect for preventing any cross-talk.

Figure 12:
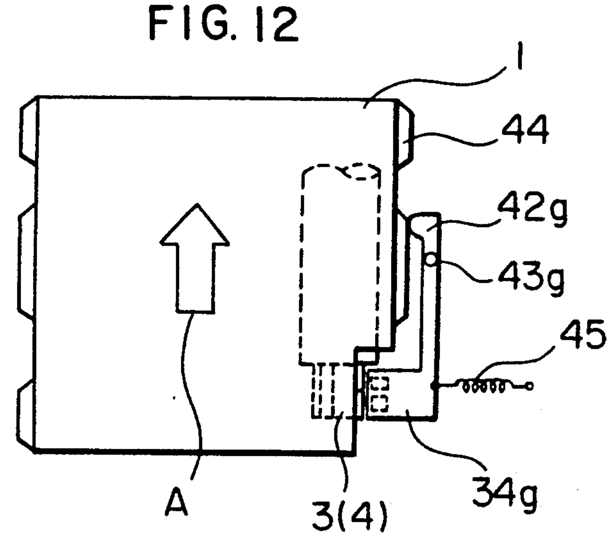
FIGS. 12 to 15 are illustrations of means for bringing a sensor holder into contact with the shaft in accordance with the operation of a mechanism in the thermal transfer printing apparatus.

FIG. 12 shows an embodiment of a sensor holder swinging means for pressing the sensor holder into contact with the shaft in the cassette.

The ink sheet cassette 1 is inserted into the thermal transfer printing apparatus in the direction of the arrow A. During the inserting operation, a hinge 44 provided on a lateral side of the cassette 1 and usually used as the bonding margin for bonding upper and lower halves of the cassette, pushes a mounting arm 42*g* so that the mounting arm 42*g* swings about a mounting hole 43*g*. The sensor holder 34*g* is usually biased by a spring 45 counter-clockwise as viewed in FIG. 12, but is pressed against the shaft 3 or 4 in the cassette 1 as a result of swinging of the arm 42*g*.

Figure 13:
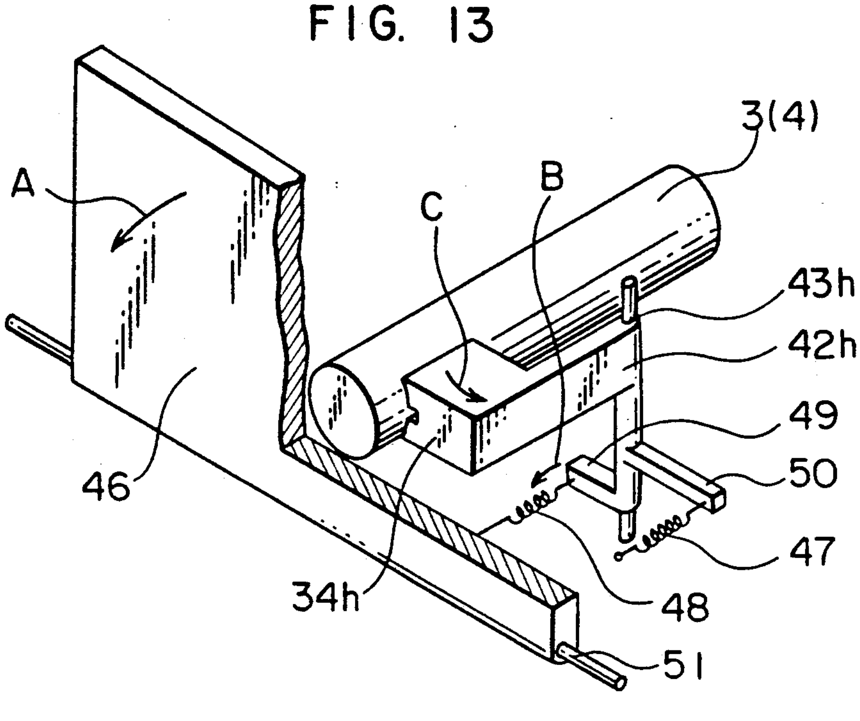

FIG. 13 is a perspective view of an embodiment in which the sensor holder 34*h* is pressed onto the shaft 3 or 4 by the force which is derived from the opening and closing action of a cassette cover 46.

In FIG. 13, the cassette 1 has already been mounted on the thermal transfer printing apparatus and the cassette cover has already been closed. In this state, the sensor holder 34*h* is pressed against the shaft 3 or 4 by the bias of a spring 47 through the action of a spring arm 50. As the cassette cover 46 is swung about a mounting shaft 51 to open position as indicated by an arrow A, the spring 48 is pulled in the direction of an arrow B so that the mounting arm 42*h* rotates in the direction of an arrow C about the mounting hole 43*h*. The spring 48 is stronger than the spring 47 so that the sensor holder 34*h* is pulled in the direction of an arrow C away from the shaft 3 or 4. When the cassette cover 46 is moved to the closing position after insertion of the cassette, the bias of the spring 48 acts to assist the motion in contrast to the opening action described above, so that the sensor holder 34*h* is brought into close contact with the shaft 3 by the bias of the spring 47.

Figure 14:
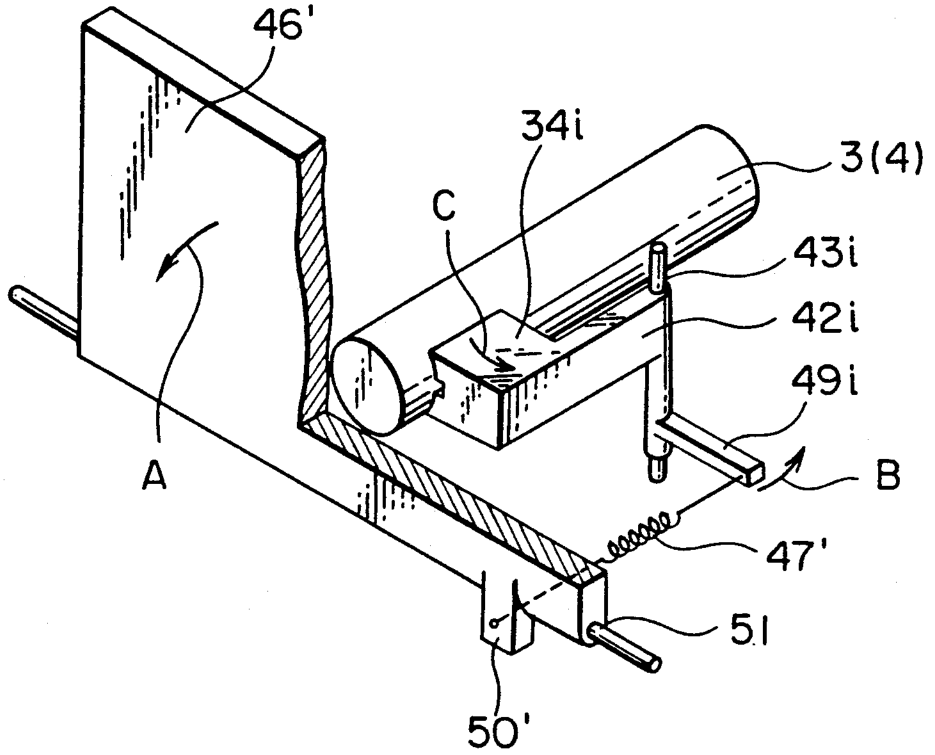

FIG. 14 is a perspective view of another embodiment which also makes use of the force derived from the opening and closing motion of the cassette cover 46' in bringing the sensor holder 34*j* into and out of contact with the shaft 3 or 4.

In FIG. 14, the cassette 1 has already been mounted in the thermal transfer printing apparatus and the cassette cover 46' has already been closed. In this state, the cassette cover 46' pulls a spring 47' through a spring arm 50'. The spring 47' in turn pulls the spring arm 49*i* so that a mounting arm 42*i* is swung about a mounting hole 43*i* so as to press the sensor holder 34*i* into contact with the shaft 3 or 4. When the cassette cover 46' is swung in the direction of the arrow A about a so that the mounting arm 42*i* is rotated in the direction of an arrow B by a sensor holder release spring (not shown) with the result that the sensor holder 34*i* also is swung in the direction of an arrow C away from the shaft 3 or 4. The sensor holder release spring, which is not shown in the drawings, is provided at the same position as the spring 48 shown in FIG. 13 or coaxially with the shaft fitting in the mounting hole 43*i*.

Figure 15:
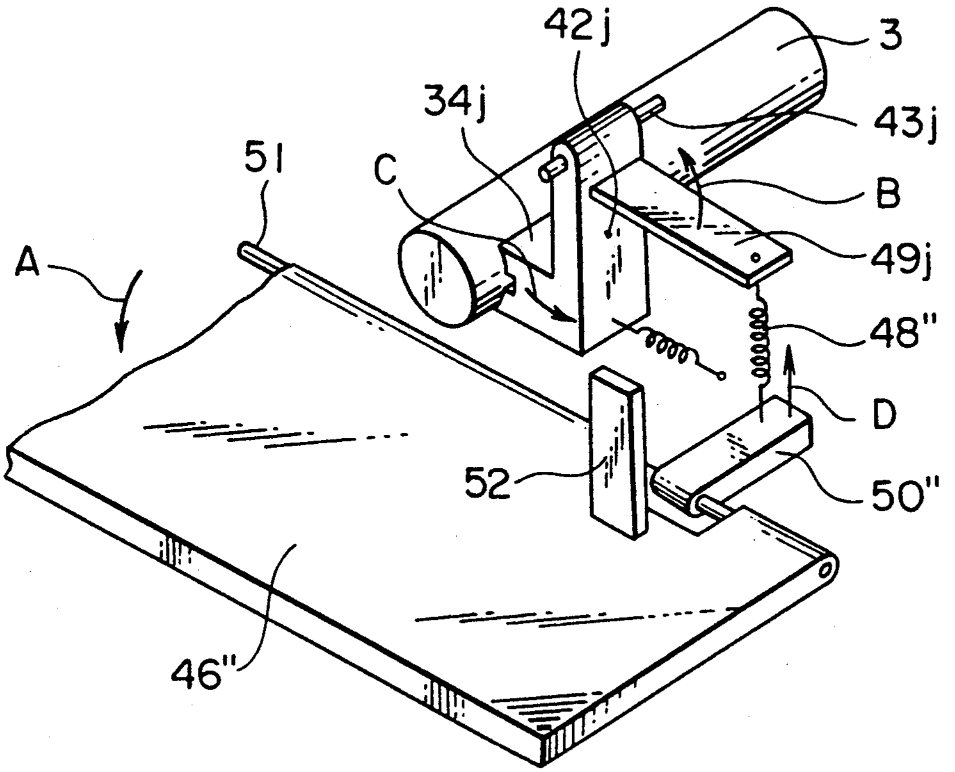

FIG. 15 is a perspective view of a different embodiment of the type in which the sensor holder is pressed onto the shaft by making use of the opening and closing action of the cassette cover 46" on the thermal transfer printing apparatus.

In FIG. 15, the cassette 1 has already been mounted in the thermal transfer printing apparatus as in the cases of FIGS. 13 and 14 but the cassette cover 46" is in the open position unlike the states shown in FIGS. 13 and 14. When the cassette cover 46" is in the closing position, a spring arm retainer 52 presses a spring arm 50" and the spring arm 50" pulls the spring 48" so that a mounting arm 42*j* is swung about the mounting hole 43*i* thereby pressing the sensor holder 34*j* into contact with the shaft 3 or 4. The cassette cover 46", i.e., the spring retainer 52, and the spring arm 50" are rotatable about a cover mounting shaft 51 independently of each other. As shown in FIG. 15, a motion of the cassette cover 46" in the opening direction of an arrow A reduces the force of the spring 48" so that the sensor holder 34*j* is pulled by the spring 47" away from the shaft 3 or 4. The separation of the sensor holder 34*j* from the shaft 3 or 4 enables the cassette to be extracted from the thermal transfer printing apparatus without being interferred with the sensor holder 34*j*. In this embodiment, the cover mounting shaft 51 extends orthogonally to the axis of and the arrangement may be such that the cover mounting shaft 51 extends in parallel with the axis of swinging of the arm 42*j*.

FIG. 16 illustrates an embodiment in which the mounting arm of the type shown in FIG. 15 is modified such as to provide a higher accuracy of height adjustment of the sensor holder 34*k* and the shaft 3 or 4.

In this case, the mounting holes 43*k* for securing the mounting arms 42*k* on the thermal transfer printing apparatus are elongated in the form of slot as shown in FIG. 16 so as to provide a degree of freedom in the positions of the mounting arm 42*k* and the sensor holder 34*k* in the vertical direction. As in the cases of the arrangements described above in connection with FIGS. 6 to 10, the vertical position of the sensor holder 34*k* is automatically adjusted such that the center of the sensor holder 34*k* is aligned with the center of the shaft 3 or 4 when the sensor holder 34*k* is pressed onto the shaft 3 or 4.

FIGS. 17A and 17B show an embodiment in which the sensor holder and the shaft 3 or 4 are automatically located with respect to each other in the axial direction.

Referring to FIG. 17A, the position of a code registered section 9 adhered to the shaft 3 or 4 has been determined with respect to a reference surface 54 on the shaft 3 or 4. At the same time, the position of the sensor holder 34*l* has been determined with respect to the same reference surface 54. With this arrangement, it is possible to determine the positions of the code registered section 9 and the sensor holder 34*l* with respect to each other at a high degree of precision. In this embodiment, the sensor holder 34*l* is provided with a positioning member 53. When the sensor holder 34*l* is moved into contact with the shaft 3 or 4, the sensor holder 34*l* follows the contour of the positioning member 53 so that the positioning member 53 and the reference surface 54 make contact with each other so that the sensor holder 34*l* is precisely positioned relative to the code registered section 9. The positioning member 53 is pressed by the bias of a spring 47*l* so that the positioning member 53 can make contact with the reference surface 54 without any gap or play, thus offering a high reproducibility of the position. When the sensor holder 34*l* is not pressed onto the shaft 3 or 4, the sensor holder 34*l* is urged toward the right by the spring 47*l* into contact with a stopper 74 so as to facilitate the engagement of the positioning member with the reference surface 54 at the time of pressing.

FIG. 18 illustrates an illustration of an embodiment in which the sensor holder is brought into contact with the shaft 3 in accordance with the movement of the thermal head into contact with the platen drum.

The thermal head 16 is located at a position shown by a broken line in FIG. 18 in a stand-by condition prior to the printing. In this state, the sensor holder 34*m* also is spaced from the shaft 3 as indicated by a broken line. The insertion and extraction of the cassette into and out of the thermal transfer printing apparatus is conducted in this state. For the purpose of performing the printing, the thermal head 16 is moved to a position shown by full line in FIG. 18. Meanwhile, a thermal head arm 56 supporting the thermal head 16 is swung about a head arm shaft 55. The end portion of the head arm 56 extending beyond the head arm shaft 55 presses the spring arm 49*m* so that the sensor holder 34*m* is swung about the mounting hole 43*m* and is pressed onto the shaft 3 by the force of a spring (not shown).

Figure 19A:
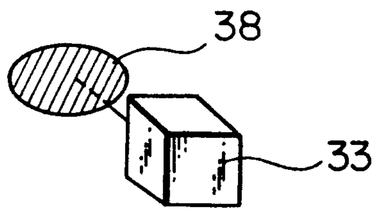
FIGS. 19A, 19B and 19C are illustrations of the positional relationship between the code registered section and an opening formed in the sensor.
Figure 19B:
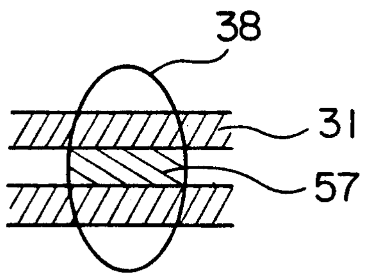
Figure 19C:
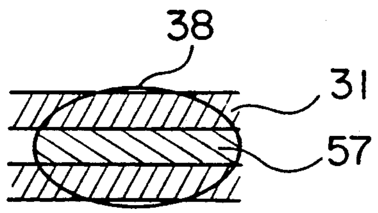

FIGS. 19A to 19C are illustrations of the configurations of the opening in the sensor and the positional relationship between the sensor holder and the code registered section.

Referring first to FIG. 19A, the opening 38 of the sensor has a form which is not point-symmetrical. Namely, the opening 38 has a width which is greater than the height. When this sensor 33 is used in a posture as shown in FIG. 19B, the area of the readable region 57 is smaller than the whole area of the opening 38 so that the sensitivity of the sensor cannot be fully utilized. In contrast, when the sensor is used in a posture as shown in FIG. 19C, the area of the readable region 57 is increased with respect to a given area of the opening 38, so that the sensitivity of the sensor can be effectively utilized.

Figure 20A:
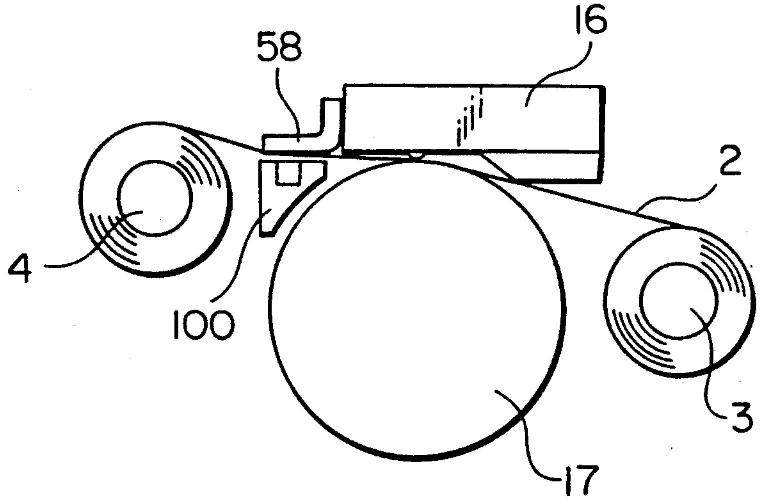
FIGS. 20A and 20B are illustrations of the position where a sensor for discriminating the color of the ink sheet is mounted.
Figure 20B:
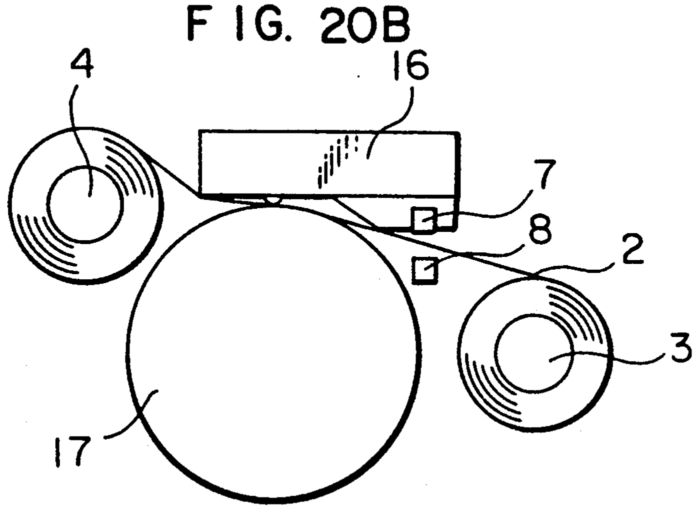

FIGS. 20A and 20B are sectional views of a thermal transfer printing apparatus illustrative of the position for mounting an ink sheet sensor which produces a signal for correctly locating an ink sheet carrying a plurality of colors upon detection of the color which is being used.

More specifically, FIG. 20A illustrates a thermal transfer printing apparatus in which the distance between the supply shaft 3 and the takeup shaft 4 is large.

The thermal head 16 carries at its one end a reflective plate 58 which opposes a sensor holder 100 across the ink sheet 2. The sensor holder 100 incorporates an ink sheet sensor. When the thermal head 16 is pressed onto the platen drum 17 as indicated in FIG. 20A, the ink sheet 2 is nipped between the sensor holder 100 and the reflective plate 58. The light emitted from the ink sheet sensor LED inside the sensor holder is transmitted through the ink sheet 2 and reflected by the reflective plate 58. The reflected light is transmitted through the ink sheet 2 again so as to impinge upon the ink sheet sensor in the sensor holder 100. The sensor analyzers the component of the light selectively transmitted through the ink sheet 2 so as to determine the color of the ink sheet 2.

FIG. 20B shows an example of the thermal transfer printing apparatus in which the distance between the supply shaft 3 and the takeup shaft 4 is too small to provide a space large enough for mounting the sensor holder 100 of the type shown in FIG. 20A. In this case, therefore, the ink sheet sensor 7 is provided on the thermal head 16 and the ink sheet sensor LED 8 is disposed on the opposite side of the ink sheet 2 to the ink sheet sensor 7. When the thermal head 16 is pressed onto the platen drum 17, the ink sheet sensor 7 and the ink sheet sensor LED 8 oppose each other so that the light from the ink sheet sensor LED is transmitted through the ink sheet 2 to reach the ink sheet sensor 7. The ink sheet sensor 7 then analyzes the light component passed through the ink sheet 2 thereby determining the color of the ink sheet as in the case of the apparatus shown in FIG. 20A. practically, the analysis of the color is conducted as follows. When an LED for red color light is used, for example, the red light component attenuates as it is transmitted through a cyan color portion of the ink sheet, but does not attenuate when it is passed through magenta or yellow color portions of the ink sheet. Therefore, the sensor can discriminate the cyan color portion of the ink sheet from portions of magenta and yellow colors simply by measuring the quantity of light. By using a plurality of combinations of light source and sensor of different colors or by using a single color sensor, it is possible to detect a plurality of colors on the ink sheet including presence of a cue mark of the region of each color.

Figure 21:
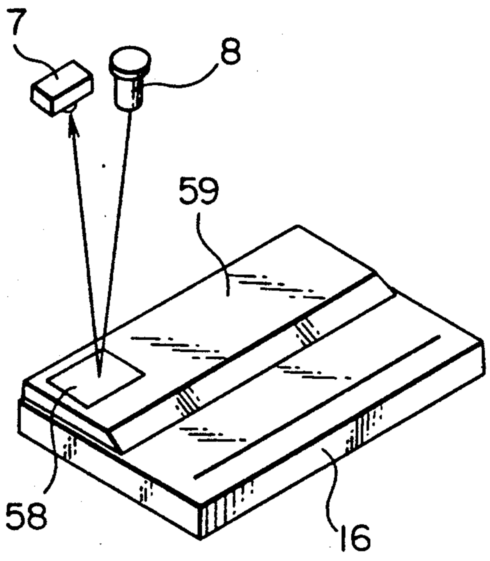
FIGS. 21 to 25 are perspective views and sectional views of an embodiment in which an ink sheet sensor and an ink sheet sensing LED are mounted on a thermal head.

FIG. 21 shows an embodiment in which a reflective plate is mounted on the thermal head.

The thermal head 16 carries ICs for controlling the heating elements of the thermal head 16. The ICs are covered by a protective IC cover. The reflective plate 58 is provided on the protective IC cover so as to oppose the ink sheet sensor 7 and the ink sheet sensor LED 8 so that the light emitted from the LED 8 and reflected by the reflective plate 58 is received by the ink sheet sensor 7 through the ink sheet 2. In this embodiment, it is not necessary to provide flexible wiring for the ink sheet sensor 7 and the ink sheet sensor LED 8 because the sensor 7 and the LED 8 are not carried by the thermal head. In general, the protective IC cover is made of a metal such as aluminum so that the cover 59 itself can be used as the reflective plate 58.

Figure 22:
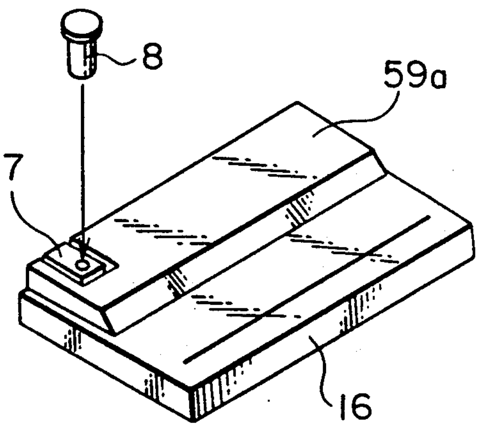

FIG. 22 shows an embodiment in which the ink sheet sensor 7 is provided on the thermal head as in the case of the embodiment described in connection with FIG. 20B.

In this embodiment, a part of the IC cover 59 is cutaway to provide a space in which the ink sheet sensor 7 is fitted such that the ink sheet sensor 7 does not project above the surface of the thermal head 16. This embodiment is suitable for a small-sized thermal transfer printing apparatus because the thermal head 16 does not project.

Figure 23:
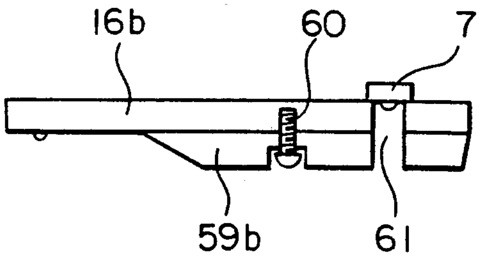

FIG. 23 shows an embodiment which also is of the type having an ink sheet sensor carried by a thermal head.

A hole 61 is formed so as to extend through the thermal head 16 and the IC cover 59*b*, and the ink sheet sensor 7 is attached to the reverse side of the thermal head 16*b*. Since an ample space is available on the reverse side of the thermal head 16, it is possible to mount an ink sheet sensor 7 even when the size of the ink sheet sensor 7 is comparatively large.

Figure 24:
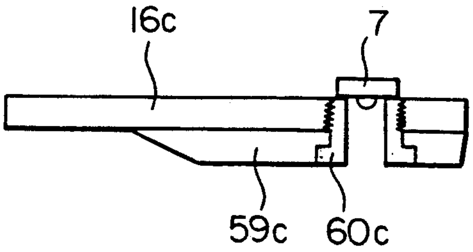

FIG. 24 shows an embodiment which is of the type having an ink sheet sensor carried by a thermal head. In this embodiment, a through hole is formed in the thermal head 16*c* as in the case of the embodiment shown in FIG. 23. The ink sensor 7, however, is mounted in a hole formed in a screw 60*c* which is used for attaching the IC cover 59*c* to the thermal head 16*c*. More specifically, a hole of, for example, hexagonal shape, is formed in the screw 60*c* for enabling a screw-tightening tool to engage with the screw 60*c*. The ink sheet sensor 7 is fitted in this hole formed in the screw 60*c*.

Figure 25:
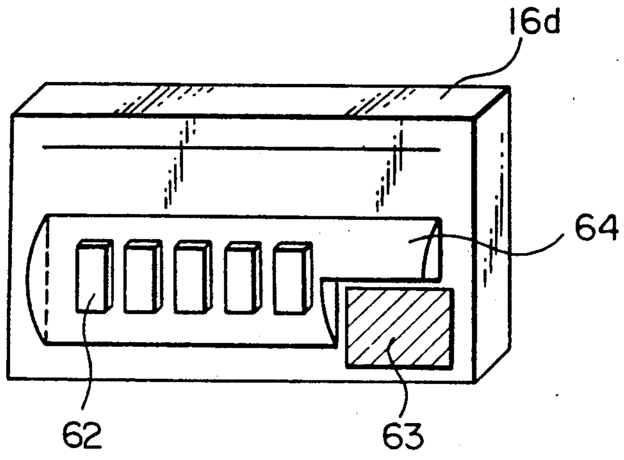

FIG. 25 shows an embodiment in which ICs on the thermal head are arranged to enable mounting of the sensor on the thermal head.

An area 63 where the ink sheet sensor 7 is mounted is preserved on the thermal head 16*d* and no other part is placed in this area. More specifically, the thermal head carries ICs 62 and a protective IC cover 64 made of, for example, an epoxy resin and capable of protecting the ICs. Any IC is not placed in the area 63 and the protective IC cover 64 also is shaped to clear the area 63 by, for example, being notched in the portion corresponding to the area 63. The area 63 can mount thereon not only the ink sheet sensor but also a sensor or a jig such as a temperature sensor for monitoring the temperature of the thermal head.

Figure 26:
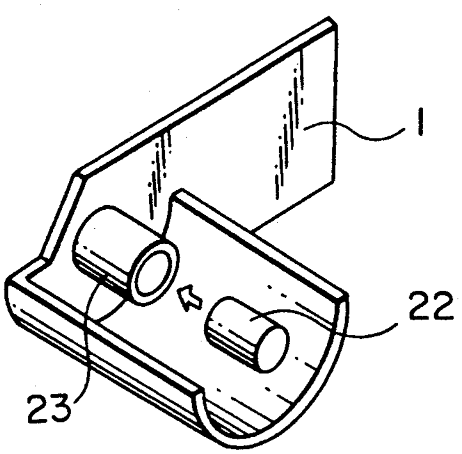
FIGS. 26 and 27 are perspective views illustrating means for mounting an end of the shaft on the cassette.

FIG. 26 shows an embodiment having a specific means for mounting the supply shaft and the takeup shaft on the cassette. The cassette have bearings 23 provided with holes for receiving ends 22 of the shafts so as to position the ends of the shafts on the cassette.

Figure 27:
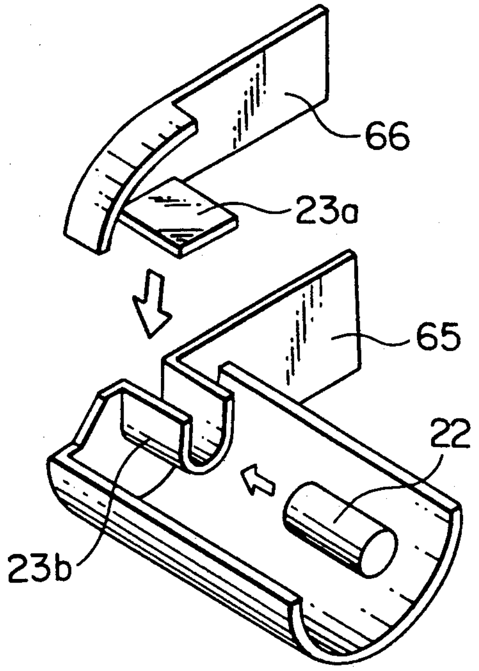

FIG. 27 shows an embodiment having a different construction of the means for mounting the shafts on the cassette. In this embodiment, the cassette is composed of an upper half part 66 and a lower half part 65 which are provided with projection 23*a* and 23*b*, respectively. When the upper and lower half parts of the cassette 66, 65 are brought together, the projections 23*a* and 23*b* in cooperation form bearings 23 which receive and position the ends of the shafts.

Figure 28A:
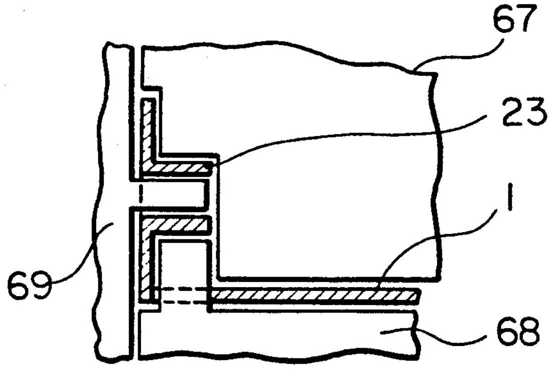
FIGS. 28A and 28B are illustrations of dies for forming an ink sheet cassette and the ink sheet cassette formed by the dies.
Figure 28B:
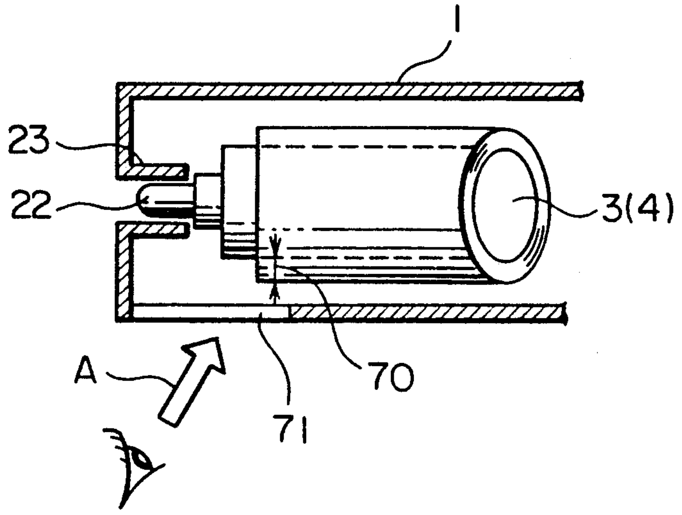

FIGS. 28A and 28B show an example of dies for forming the ink sheet cassette of the present invention and a cassette formed by the die.

More specifically, FIG. 28A is a sectional view of the dies. The dies are composed of parts 67, 68 and 69 which form a die cavity. A material such as molten plastic is poured into the die cavity so as to form the lower half part (see FIG. 26) of the ink sheet cassette 1. In order to form the bearings 23 shown in FIG. 26, the die part 69 and the die part 68 are adapted to be extracted left and upward, respectively, as viewed in FIG. 28A. A hole for enabling extraction of the die part 68 is formed in the cassette. More specifically, referring to FIG. 28B, a mold snapping hole 71 is formed in the cassette 1. The hole 71 can be used also as a viewing hole which gives a view to the shaft 3. The diameter 70 of the roll of the ink sheet wound on the supply shaft 3 varies according to the amount of the ink sheet left on the supply shaft 3. It is possible to determine the amount of the ink sheet remaining on the supply shaft 3 by visually or mechanically inspecting the diameter 70 of the ink sheet roll through the viewing hole 71, i.e., the mold snapping hole 71. The mold snapping hole 71 also can be used as the sight hole 25 shown in FIG. 25 for enabling reading of the code of the code registered section 9 provided on the surface of the shaft 3.

Figure 29A:
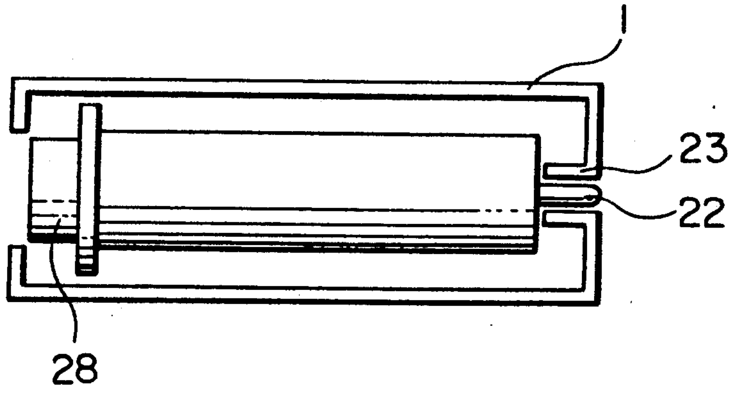
FIGS. 29A and 29B are sectional views of stopper means for preventing the shaft from withdrawing into the cassette.
Figure 29B:
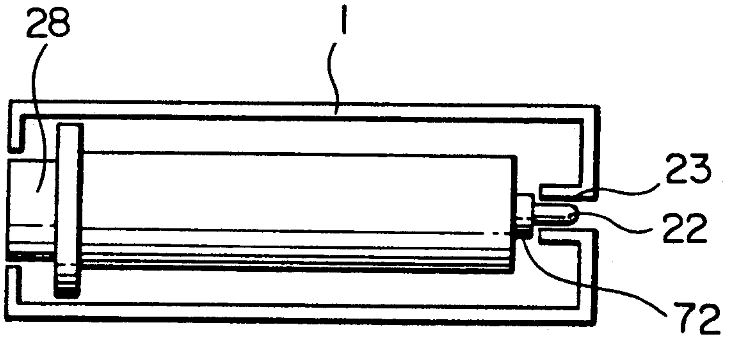

FIG. 29B shows an embodiment which has a withdrawal prevention means provided on the end of the shaft so as to prevent the shaft from withdrawing into the cassette.

Referring to FIG. 29A, if the shaft 3 or 4 is forced into the cassette in excess of a predetermined amount of insertion, the end 22 of the shaft may slide into the bearing 23 deeper so that the torque transmission portion 28 may completely slip into the cassette. This problem, however, is avoided because the withdrawal prevention means 72 provided on the end of the shaft engages with the cassette so as to prevent the torque transmitting portion from completely slipping into the cassette.

Figure 30:
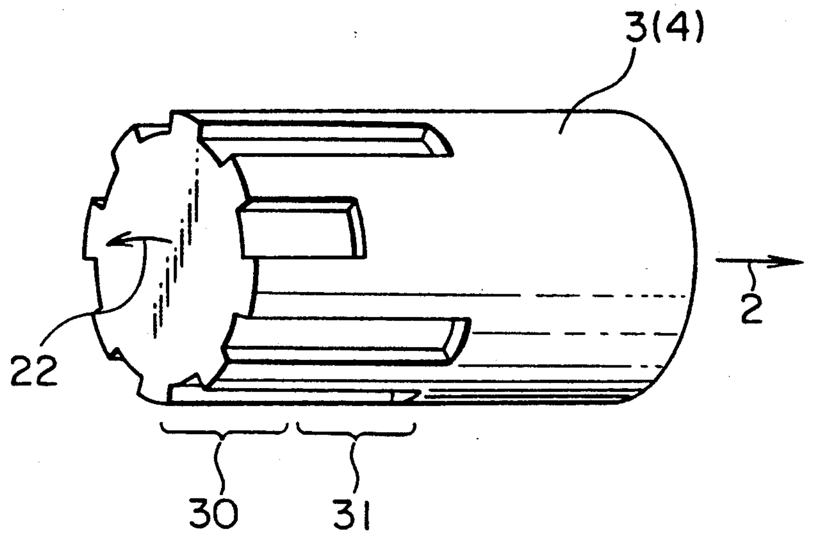
FIGS. 30, 31A and 31B are illustrations of a different embodiment in which the code registered section is provided on the shaft.

FIG. 30 shows an embodiment in which a code registered section is formed in the course of fabrication of the shaft.

In the embodiment, the shaft 3 or 4 is provided with a plurality of grooves and, hence, ridges formed in the outer peripheral surface thereof. Thus, the clock 30 and the bar code 31 are presented by coloring the ridges and grooves in white and black, respectively. Preferably, the clock 30 is formed adjacent to the shaft end 22 while the bar code 31 is formed adjacent to the ink sheet 2 so that separation of the shaft from the shaft-forming die is facilitated. The coloring of the ridges and grooves may be conducted by forming the shaft from a white material and applying a black paint or the like into the grooves so as to form a black and white pattern. Alternatively, the shaft is made from a black material with the surfaces of the ridges roughened to provide irregular reflection so that the ridges can materially be regarded as being white portions.

Figure 31A:
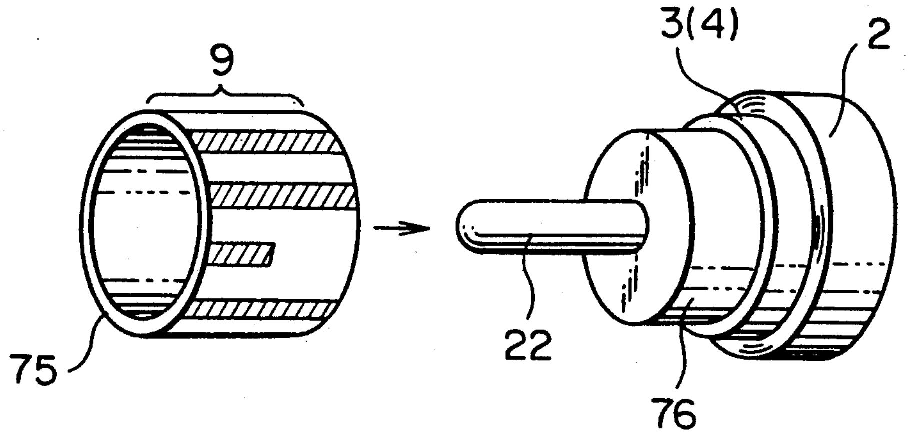
Figure 31B:
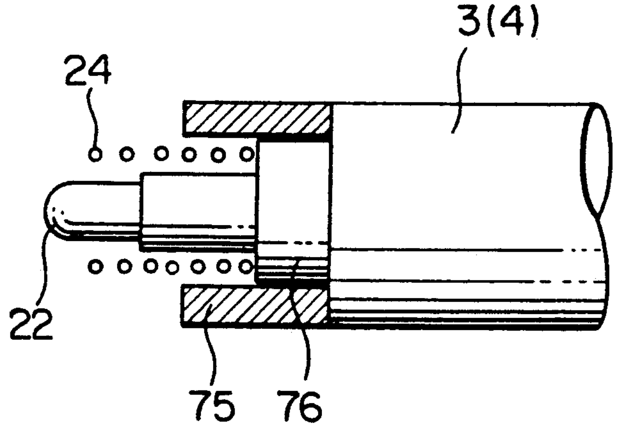

FIGS. 31A and 31B show an embodiment in which a code registered section is not directly formed on the shaft but is written on a bar-code adapter which is then secured to an end portion of the shaft.

Referring to FIG. 31A, a code registered section 9 is provided on the outer peripheral portion of a bar-code adapter 75. The bar-code adapter 75 is attached to an adapter receiving portion 76 provided on the end of the shaft. The code registered section 9 may be provided by forming, on the code adapter 75, grooves and ridges as shown in FIG. 30 or may be provided by applying a label-type member on the shaft. This eliminates any necessity for the shafts to be produced in a plurality of lots. In addition, it is possible to attain a high degree of parallelism of the code registered section 9 with the shaft 3 or 4. FIG. 31B is a sectional view showing the bar-code adapter 75 secured to the shaft 3 or 4. It is possible to provide the shaft pressing spring shown in FIG. 3C in the space inside the bar code adapter 75.

Figure 32:
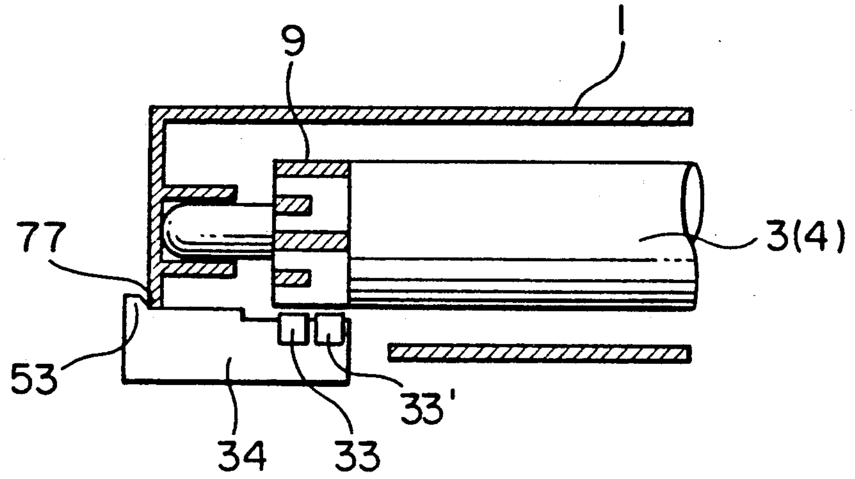
FIGS. 32 and 33 are illustrations of an example of arrangement for locating a sensor holder with respect to the code registered section on the shaft.

FIG. 32 shows an embodiment having a specific means for determining the positional relationship between the shaft and the sensor holder for reading the code registered section on the shaft. The shaft is positioned with respect to the thermal transfer printing apparatus by virtue of the correct positioning of the shaft and the cassette relative to each other and the correct positioning of the thermal transfer printing apparatus and the positioning holes in the cassette. Thus, the cassette and shaft are positioned with a comparatively high degree of positional accuracy. In this embodiment, the determination of position of the sensor holder 34 is conducted by cooperation between a positioning surface 77 provided on the cassette 1 and a positioning member 53 on the sensor holder 34. Since a high positioning accuracy is guaranteed between the shaft 3 or 5 and the cassette 1, a high precision of positional relationship also is obtained between the sensor holder 34 and the shaft 3 or 4. In this embodiment, it is possible to form a slight gap between the sensor holder 34 and the shaft 3 or 4. This eliminates rubbing of the code registered section by the sensor 33, thus avoiding breakage of the code registered section 9.

Figure 33:
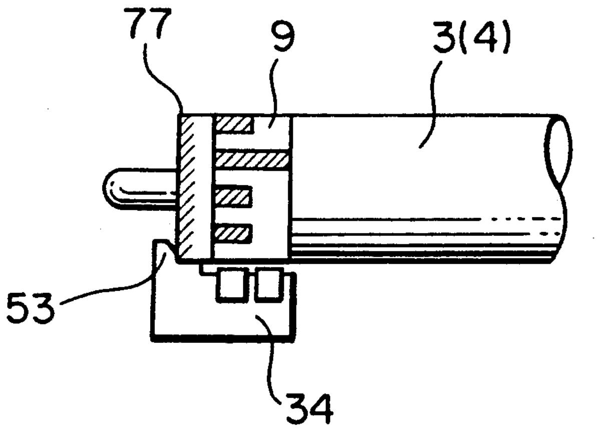

FIG. 33 shows an embodiment which employs a different arrangement for positioning the sensor holder 34 and the shaft 3 or 4 with respect to each other.

An example of the arrangement for positioning the shaft 3 or 4 and the sensor holder 34 relative to each other in the axial direction was described above with reference to FIG. 17. The embodiment which will be described hereinunder with reference to FIG. 32 is designed for positioning the sensor holder 34 and the shaft 3 or 4 in the pressing direction. The shaft 3 or 4 is provided on a portion of the outer peripheral surface thereof with a positioning surface 77. The shaft 3 contacts with a positioning member at this positioning surface 77 so that the sensor holder 34 and the shaft 3 or 4 are positioned with respect to each other. In this embodiment, it is possible to form a slight gap between the sensor holder 34 and the code registered section 9 as in the case of the embodiment shown in FIG. 32, so as to avoid rubbing of the code registered section by the sensor 33, thus preventing breakage of the code registered section 9.

Figure 34A:
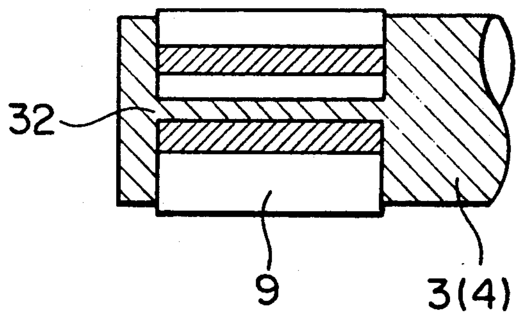
FIGS. 34A and 34B are illustrations of an embodiment in which a code registered section in the form of a real label is provided on a shaft.
Figure 34B:
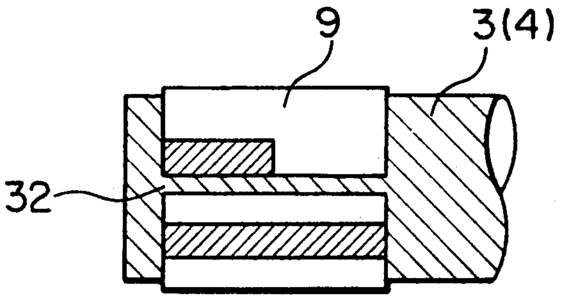

FIGS. 34A and 34B show an embodiment having a code registered section formed on a label-type member which is adhered to the outer peripheral surface of the shaft, wherein a specific arrangement is employed for dealing with a seam between the ends of the label-type member. The seam is inevitably formed since the label-type member is adhered to the shaft so as to wind round the shaft. When the seam is formed by both ends of the label-type member superposed one on the other, no substantial problem is caused except such a risk for the code registered section to be broken as a result of rubbing by the sensor holder. However, when the ends of the label-type are not superposed, i.e., the seam is formed to provide a gap 32 between two opposing ends of the label-like member as shown in FIG. 34A, the reading of the data may be hampered because a portion of the shaft is exposed through the gap. For instance, when the shaft has substantially the same reflectively as that of the black mark of the code registered section 9, an error in reading may take place because a pattern which does not confirm with the bar code pattern format is presented, when the gap is formed adjacent to a pattern portion in which the bar code portion and the clock portion have different colors as shown in FIG. 34B.

In the arrangement shown in FIG. 34A, pattern portions in which the bar code and the clock have the same color are provided on both sides of the gap 32. When the color of the shaft is black, the portion of the shaft exposed through the gap belongs to a black bar of the code registered section of FIG. 34A, so that an exact recording is made possible though the recording pitch of the code registered section is changed slightly. In this embodiment, the reading of the bar code is triggered by the change of color from black to white and vice versa in the clock portion, so that the above-mentioned change in the recording pitch does not cause any reading error. When the seam is formed as the gap between the opposing ends of the label-type member as in the embodiment shown in FIG. 34B, it is essential that the color of the shaft should be distinctive black or white. Namely, the shaft should have either black or white color rather than gray or halftone, by suitable selection of the shaft material in the course of production of the shaft or by application of a paint after the formation of the shaft, so that the portion of the shaft appearing through the gap between the opposing ends of the label-type member is utilized as a portion of a white or black bar of the bar code in the code registered section.

As described above, according to the present invention, it is possible to obtain a thermal transfer type printing apparatus which enables information concerning the ink sheet to be written and read easily so that the performance of the ink sheet is fully utilized well coping with variation of specifications of the ink sheet, thus offering a high quality of the print.

The invention also makes it possible to mount a sensor capable of discriminating the color of the ink sheet even on a small-sized thermal transfer printing apparatus in which the distance between the supply shaft and the takeup shaft is small, thereby allowing automatic printing in the expected color. The invention also makes it possible to produce an inexpensive and reliable ink sheet cassette having various advantages such as easy mounting of the shafts on the cassette, formation of a viewing window by an effective use of a specific configuration of a cassette forming die, prevention of withdrawal of the shafts into the cassette, and so forth.

What is claimed is:

1. In a thermal printing apparatus adapted to use an ink sheet cassette including a pair of ink shafts on which both ends of a continuous ink sheet having a continuous film or paper with inks applied thereon are wound, a cassette case in which said ink shafts are received, at least one of said ink shafts being adapted to be drivingly connected in the axial direction to a torque supply shaft inserted from the outside of said cassette case so that driving torque is supplied from said torque supply shaft to said ink shaft, and to print an information on said print paper by heating said ink sheet by means of a thermal head while said ink sheet is superposed on a print paper, the improvement comprising:

a clock pattern on said ink sheet cassette, said clock pattern constituted by a line pattern having two colors of different reflectivity and provided on the outer periphery of said ink shaft by means of sticking or printing to extend in parallel to said ink shafts and to divide the periphery of said ink shaft into a plurality of equidistantly extending blocks so that as said ink shafts rotate, the light reflectivity on said ink shafts varies and such variation can be observed by an optical reading means to be converted into an electrical change;

a data pattern provided on said ink sheet cassette in alignment with said plurality of blocks of said clock pattern and adjacent to each of said plurality of blocks of said clock pattern such that portions disposed adjacent to portions of a first color of said two colors are always described by the same color as said first color and portions disposed adjacent to portions of a second color of said clock pattern are selectively described by said first or second color to enable describing an information of one bit on each of said plurality of blocks of said clock pattern depending upon the discrimination of the first or second color;

first optical reading means capable of converting into an electric signal a change of reflectivity from said first color to said second color of the clock pattern; and, second optical reading means capable of converting an electric signal a difference of reflectivity between said first and second colors of said data pattern.

2. An apparatus as set forth in claim 1, further comprising: a sensor holder mounting thereon said first and second optical reading means and having a slit of a width substantially equal to or smaller than the width of said clock pattern and said data pattern, said sensor holder enabling mounting said first and second optical reading means inside of said slit, said sensor holder being adapted to come close to said clock pattern and said data pattern with said slit in parallel to said two patterns to read said information.

3. An apparatus as set forth in claim 2, wherein said apparatus is configured to automatically position said sensor holder relative to said clock pattern and said data pattern.

4. An apparatus as set forth in claim 2, further comprising:

biasing said sensor holder against said clock pattern and said data pattern, said biasing being performed in interlocking relationship with the printing action of said apparatus without any exclusive driving mechanism.

5. An apparatus as set forth in claim 2, further comprising:

biasing said sensor holder against said clock pattern and said data pattern, said biasing being performed in association with an opening and closing action of a cover for mounting said ink sheet cassette in said apparatus and a non-printing action such as an insertion of said ink sheet cassette.

6. An apparatus as set forth in claim 2, wherein said slit is such that a width thereof is larger than a height thereof and said first and second reading means are mounted on said sensor holder with a widthwise direction of said slit extending in an axial direction of said ink shaft along which said clock pattern and said data pattern are aligned.

7. In a thermal transfer printing apparatus adapted to use an ink sheet cassette including a pair of ink shafts which have ends which are received into holes in said ink cassette so as to enable said ink shafts to be mounted on said cassette and on which both ends of a continuous ink sheet having a continuous film or paper with inks applied thereon are wound, a cassette case in which said ink shafts are received, at least one of said ink shafts being adapted to be drivingly connected in the axial direction to a torque supply shaft inserted from the outside of said cassette case so that driving torque is supplied from said torque supply shaft to said ink shaft, and to print an information on said print paper by heating said ink sheet by means of a thermal head while said ink sheet is superposed on a print paper, the improvement comprising:

a clock pattern on said ink sheet cassette, said clock pattern constituted by a line pattern having two colors of different reflectivity and provided on the outer periphery of said ink shaft by means of sticking or printing to extend in parallel to said ink shafts and to divided the periphery of said ink shaft into a plurality of equidistantly extending blocks so that as said ink shafts rotate, the light reflectivity on said ink shafts varies and such variation can be observed by an optical reading means to be connected into an electrical charge;

a data pattern provided on said ink sheet cassette in alignment with said plurality of blocks of said clock pattern and adjacent to each of said plurality of blocks of said clock pattern such that portions disposed adjacent to portions of a first color of said two colors are always described by the same color as said first color and portions disposed adjacent to portions of a second color of said clock pattern are selectively described by said first or second color to enable describing an information of one bit on each of said plurality of blocks of said clock pattern depending upon the discrimination of said first or second color;

first optical reading means capable of converting into an electric signal a change of reflectivity from said first color to said second color of the clock pattern; and, a second optical reading means capable of converting an electric signal a difference of reflectivity between said first and second colors of said data pattern.

8. A thermal transfer printing apparatus according to claim 7, wherein said holes are formed by joint portions of an upper half part and a lower half part of said ink sheet cassette.

9. A thermal transfer printing apparatus according to claim 1, wherein said clock pattern is provided on the outer peripheral surface of an ink supply shaft.

10. A thermal transfer printing apparatus according to claim 1, wherein said clock pattern is provided on a ring-like member which is detachably secured to an end of said shaft to provide for mounting and replacement of said clock pattern on said shaft.

11. A thermal transfer printing apparatus according to claim 1, wherein said clock pattern is provided by locally recessing or protruding the surface of said ink shaft.

12. A thermal transfer printing apparatus according to claim 2, wherein a portion of said sensor holder is adapted to abut against a positioning surface provided on the outer contour of said ink sheet cassette, thereby ensuring the relative positions of said sensor holder and said ink shaft.

13. A thermal transfer printing apparatus according to claim 2, wherein a portion of said sensor holder is adapted to abut against a portion of the surface of said ink shaft other than the portion where said clock pattern is provided, thereby ensuring the relative positions of said sensor holder and said ink shaft.

14. A thermal transfer printing apparatus according to claim 1, wherein said clock pattern is provided on the outer peripheral surface of said shaft by applying on said surface a label-type member on which said clock pattern is printed.

15. A thermal transfer printing apparatus according to claim 14, wherein the code marks of said first pattern portion and said second pattern portion are of the same color, at each side of a gap formed between opposing ends of said label-type member adhered to said outer peripheral surface of said shaft.

16. A thermal transfer printing apparatus according to claim 1, wherein said shaft is made of a material of a color which can be recognized as being the same as one of the two colors which form the bar codes or is coated with a coloring material of said color.

17. A thermal transfer printing apparatus according to claim 1, wherein said reading means having such a reading sensitivity level that the color of said shaft is judged to be the same as one of two colors which form the bar codes.

18. A thermal transfer printing apparatus according to claim 2, wherein a portion of said sensor holder is adapted to abut against a positioning surface provided on the outer contour of said ink sheet cassette, thereby ensuring the relative positions of said sensor holder and said shaft.

19. A thermal transfer printing apparatus according to claim 2, wherein a portion of said sensor holder is adapted to abut against a portion of the surface of said ink shaft outer than the portion where said clock pattern is provided, thereby ensuring the relative positions of said sensor holder and said ink shaft.

20. In an ink sheet cassette including a pair of ink shafts on which both ends of a continuous ink sheet having a continuous film or paper with inks applied thereon are wound, and a cassette case in which said ink shafts are received, at least one of said ink shafts being adapted to be drivingly connected in the axial direction to a torque supply shaft inserted from the outside of said cassette case so that driving torque is supplied from said torque supply shaft to said ink shaft, the improvement comprising a clock pattern constituted by a line pattern having two colors of different reflectivity and provided on the outer periphery of said ink shaft by means of sticking or printing to extend in parallel to said ink shafts and to divide the periphery of said ink shaft into a plurality of equidistantly extending blocks so that as said ink shafts rotate, the light reflectivity on said ink shafts varies; and, a data pattern provided in alignment with said plurality of blocks of said clock pattern and adjacent to each of said plurality of blocks of said clock pattern such that portions disposed adjacent to portions of a first color of said two colors are always described by the same color as said first color and portions disposed adjacent to portions of a second color of said clock pattern are selectively described by said first or second color to enable describing an information of one bit on each of said plurality of blocks on said clock pattern depending upon the discrimination of the first or second color.

21. An ink sheet cassette as set forth in claim 20, further comprising a peep hole provided in a portion of a cassette case to be used and positioned corresponding to the roll of ink sheet wound around said ink shafts and marks provided on the outer periphery of said ink shafts, said peep hole being constituted by a mold snapping hole which is formed by molds adapted for molding the cassette case.

22. An ink sheet cassette as set forth in claim 20, wherein said ink sheet cassette mounting thereon in positions parallel to each other a supply shaft around which said ink sheet is wound and from which said ink sheet is paid out and a takeup shaft for rolling said ink sheet, said ink shafts being axially movable in said ink sheet cassette, and further comprising stopper means provided on the tip ends of said ink shafts for limiting the positions of movement of said ink shafts so as to prevent said ink shafts from moving to positions where said shafts are disengaged from said ink sheet cassette during the movement within said ink sheet cassette.

23. An ink sheet cassette according to claim 20, wherein said code registered section is provided on the outer peripheral surface of said supply shaft of said ink sheet cassette.

24. An ink sheet cassette according to claim 20, wherein said code registered section is provided on a ring-like member which is detachably secured to an end of said shaft, whereby said code registered section can be mounted on said shaft and be replaced by a new one.

25. An ink sheet cassette according to claim 20, wherein said code registered section is provided by locally recessing or protruding the surface of said ink shaft.

26. An ink sheet cassette according to claim 20, wherein said code registered section is provided on the outer peripheral surface of said shaft by applying on said surface a label-type member on which said code registered section has been printed.

27. An ink sheet cassette according to claim 26, wherein the code marks of said first pattern portion and said second pattern portion are of the same color, at each side of a gap formed between opposing ends of said label-type member applied on said outer peripheral surface of said shaft.

28. An ink sheet cassette according to claim 26, wherein said shaft is made of a material of a color which can be recognized as being the same as one of the two colors which form the bar codes or is coated with a coloring material of said color.

29. In an ink sheet cassette including a pair of ink shafts on which both ends of a continuous ink sheet having a continuous film or paper with inks applied thereon are wound, and a cassette case in which said ink shafts are received, said ink shafts having ends are received into holes in said ink sheet cassette so as to enable said ink shafts to be mounted on said cassette, at least one of said ink shafts being adapted to be drivingly connected in the axial direction to a torque supply shaft inserted from the outside of said cassette case so that driving torque is supplied from said torque supply shaft to said ink shaft;

the improvement comprising a clock pattern constituted by a line pattern having two colors of different reflectivity and provided on the outer periphery of said ink shaft by means of sticking or printing to extend in parallel to said ink shafts and to divide the periphery of said ink shaft into a plurality of equidistantly extending blocks so that as said ink shafts rotate, the light reflectivity on said ink shafts varies; and;

a data pattern provided in alignment with said plurality of blocks of said clock pattern and adjacent to each of said plurality of blocks of said clock pattern such that portions disposed adjacent to portions of a first color of said two colors are always described by the same color as said first color and portions disposed adjacent to portions of a second color of said clock pattern are selectively described by said first or second color to enable describing an information of one bit on each of said plurality of blocks of said clock pattern depending upon the discrimination of the first or second color.

30. An ink sheet cassette according to claim 29, wherein said ink sheet cassette is composed of an upper half part and a lower half part and said holes are formed by joint portions of said upper and lower half parts.

* * * * *

UNITED STATES PATENT AND TRADEMARK OFFICE
CERTIFICATE OF CORRECTION

PATENT NO. : 5,079,565

DATED : January 7, 1992

INVENTOR(S) : Hiroshi Shimizu, et al.

It is certified that error appears in the above-identified patent and that said Letters Patent is hereby corrected as shown below:

Claim 1, column 18, line 3, delete "constituted by" and insert therefor --comprising--.
Claim 2, column 18, line 35, delete "thereon" and insert therefor --on--.
Claim 7, column 19, line 12, delete "the" and insert therefor --an--;
line 20, delete "constituted by" and insert therefor --comprising--;
line 24, delete "divided" and insert therefor --divide--; and,
line 29, delete "charge" and insert therefor --change--.
Claim 19, column 20, line 41, delete "outer" and insert therefor --other--.
Claim 20, column 20, lines 53-54, delete "constituted by" and insert therefor --comprising--.
Claim 21, column 21, line 11, delete "being constituted by" and insert therefor --comprising--.
Claim 29, column 22, line 17, delete "the" and insert therefor --an--;
line 18, delete "the" and insert therefor --an--; and,
lines 21-22, delete "constituted by" and insert therefor --comprising--.

Signed and Sealed this

Twenty-second Day of June, 1993

Attest:

MICHAEL K. KIRK

*Attesting Officer*

*Acting Commissioner of Patents and Trademarks*